US012574762B2

(12) United States Patent
Velev et al.

(10) Patent No.: US 12,574,762 B2
(45) Date of Patent: Mar. 10, 2026

(54) MANAGING A NETWORK SLICE PARAMETER FOR ADMISSION CONTROL

(71) Applicant: Lenovo (Singapore) Pte. Ltd., New Tech Park (SG)

(72) Inventors: Genadi Velev, Darmstadt (DE); Dimitrios Karampatsis, Ruislip (GB); Ishan Vaishnavi, Munich (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 237 days.

(21) Appl. No.: 18/258,478

(22) PCT Filed: Dec. 20, 2021

(86) PCT No.: PCT/IB2021/062052
§ 371 (c)(1),
(2) Date: Jun. 20, 2023

(87) PCT Pub. No.: WO2022/130365
PCT Pub. Date: Jun. 23, 2022

(65) Prior Publication Data
US 2024/0306008 A1      Sep. 12, 2024

Related U.S. Application Data

(60) Provisional application No. 63/127,988, filed on Dec. 18, 2020.

(51) Int. Cl.
*H04W 24/02*      (2009.01)
*H04W 4/50*      (2018.01)

(52) U.S. Cl.
CPC ............. *H04W 24/02* (2013.01); *H04W 4/50* (2018.02)

(58) Field of Classification Search
CPC ..... H04W 48/18; H04W 24/02; H04W 60/00; H04W 76/11; H04W 76/12; H04W 8/06;
(Continued)

(56) References Cited

U.S. PATENT DOCUMENTS

| | | | |
|---|---|---|---|
| 12,225,402 B2 * | 2/2025 | Poe ..................... | H04L 41/5003 |
| 2021/0099316 A1 * | 4/2021 | Wang ..................... | H04W 4/24 |

(Continued)

FOREIGN PATENT DOCUMENTS

WO      WO-2023215347 A1 *  11/2023  ............ H04W 24/02

OTHER PUBLICATIONS

PCT/IB2021/062052, "Notification of Transmittal of the International Search Report and the Written Opinion of the International Searching Authority, or the Declaration", International Searching Authority, Apr. 4, 2022, pp. 1-13.
(Continued)

*Primary Examiner* — Matthew C Sams
(74) *Attorney, Agent, or Firm* — Kunzler Needham & Hilton

(57) ABSTRACT

Apparatuses, methods, and systems are disclosed for managing a network slice parameter. One apparatus includes a transceiver and processor that receives a request from a first reporting network function comprising an indication for a status change of a network slice parameter for admission control. The processor sends a request to a global network slice admission control function about the status change of the network slice parameter and receives a response from the global network slice admission control function, said response comprising a result indication for the network slice parameter.

18 Claims, 13 Drawing Sheets

(58) Field of Classification Search
CPC .............. H04W 84/042; H04W 24/08; H04W
28/0284; H04W 28/16; H04W 36/14;
H04W 4/02; H04W 4/24; H04W 48/00;
H04W 48/02; H04W 48/06; H04W 48/16;
H04W 60/04; H04W 76/10; H04W 76/18;
H04W 76/30; H04W 8/08; H04W 8/12;
H04W 8/18; H04W 8/24; H04L 41/40;
H04L 41/5009; H04L 12/1407; H04L
41/0816; H04L 41/0895; H04L 41/0897;
H04L 41/5019; H04L 41/5054; H04M
15/64; H04M 15/65; H04M 15/66; H04M
15/8228
See application file for complete search history.

(56) References Cited

U.S. PATENT DOCUMENTS

| | | | | |
|---|---|---|---|---|
| 2021/0211974 A1* | 7/2021 | Prabhakar | ............... | H04W 8/24 |
| 2021/0297977 A1* | 9/2021 | Prabhakar | ............... | H04W 8/06 |
| 2022/0248318 A1* | 8/2022 | Qiao | .................... | H04W 60/04 |
| 2022/0264357 A1* | 8/2022 | Poe | .................... | H04L 41/5003 |
| 2022/0264427 A1* | 8/2022 | Ianev | .................... | H04W 28/16 |
| 2022/0264439 A1* | 8/2022 | Ianev | .................... | H04L 41/40 |
| 2023/0030339 A1* | 2/2023 | Zhu | .................... | H04W 48/06 |
| 2023/0051733 A1* | 2/2023 | Shah | .................... | H04L 41/0897 |

OTHER PUBLICATIONS

GSMA, "Generic Network Slice Template Version 4.0", Official Document NG.116, Gsm Association, Nov. 23, 2020, pp. 1-66.
NEC et al., "KI#2 Sol#10: Updates to Solution #10 Max number of PDU Sessions per Network Slice control", SA WG2 Meeting #139E S2-2003625, Jun. 1-12, 2020, pp. 1-4.
Apple, "KI #5, New Sol: NSQ assisted dynamic adjustment of data rate per slice via user plane adjustment", SA WG2 Meeting #139E S2-2003804, Jun. 1-12, 2020, pp. 1-4.
CATT, "KI #1, 2&5, New Sol: Support of network slice quota control and enforcement", 3GPP TSG-SA WG2 Meeting #139E S2-2004075, Jun. 1-12, 2020, pp. 1-6.
NEC, "KI#2 Sol#10: Updates to Solution #10 Max number of PDU Sessions per Network Slice control", SA WG2 Meeting #139E (e-meeting) S2-2005081, Aug. 19-Sep. 1, 2020, pp. 1-4.

* cited by examiner

900

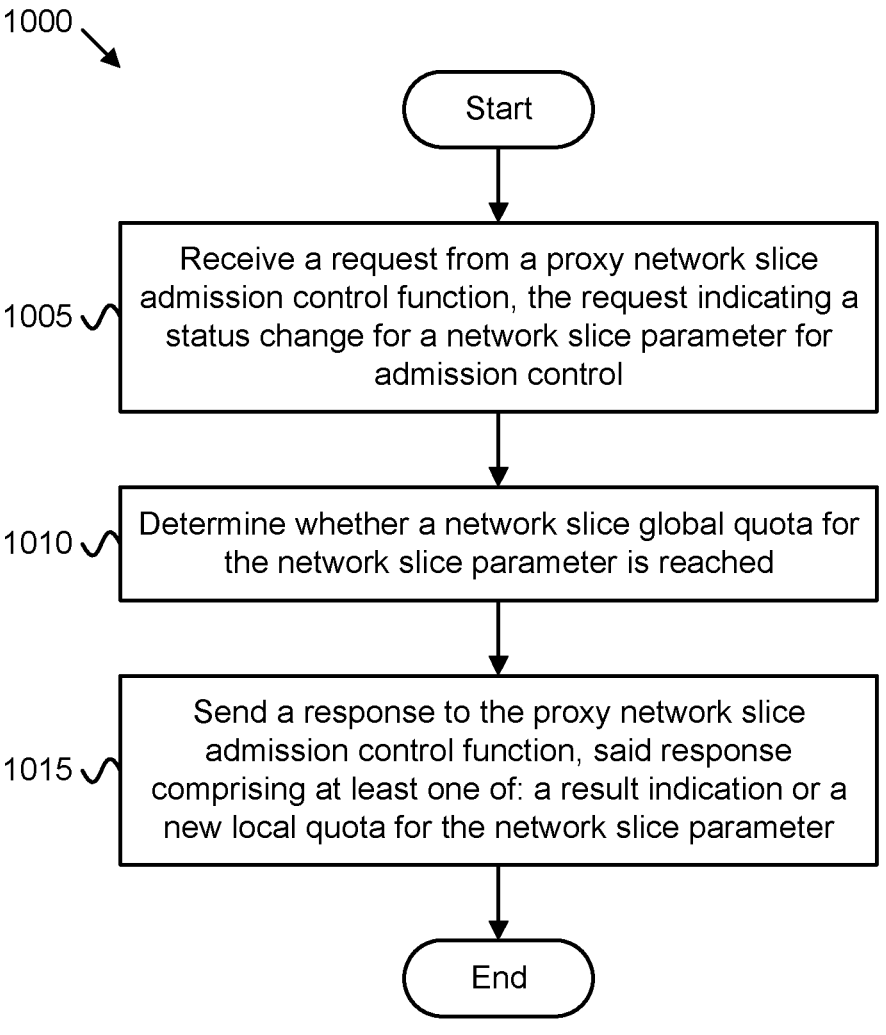

1000

Start

1005 — Receive a request from a proxy network slice admission control function, the request indicating a status change for a network slice parameter for admission control 1010 — Determine whether a network slice global quota for the network slice parameter is reached 1015 — Send a response to the proxy network slice admission control function, said response comprising at least one of: a result indication or a new local quota for the network slice parameter End

FIG. 10

MANAGING A NETWORK SLICE PARAMETER FOR ADMISSION CONTROL

CROSS-REFERENCE TO RELATED APPLICATIONS

This application claims priority to U.S. Provisional Patent Application No. 63/127,988 entitled "NETWORK SLICE ATTRIBUTE MANAGEMENT" and filed on Dec. 18, 2020 for Genadi Velev, Apostolis Salkintzis, and Dimitrios Karampatsis, which application is incorporated herein by reference.

FIELD

The subject matter disclosed herein relates generally to wireless communications and more particularly relates to managing a network slice attribute.

BACKGROUND

In certain wireless networks, network slicing may be supported. A "network slice" refers to a portion of a (e.g., 5G) core network optimized for a certain traffic type or communication service. A network slice customer (e.g., a vertical or service provider) can negotiate or request network slice characteristics from the network operator deploying the network slice. The network slice characteristics may be identified by network slice attributes. Possible network slice attributes are described in document GSMA 5GJA NG.116 "Generic Network Slice Template". The Generic Network Slice Template ("GST") is used by the network operator to derive the network slice characteristics.

BRIEF SUMMARY

Disclosed are procedures for managing a network slice attribute. Said procedures may be implemented by apparatus, systems, methods, or computer program products.

One method of an admission control network function for managing a network slice parameter includes receiving a request from a first reporting network function comprising an indication for a status change of a network slice parameter for admission control. The method includes sending a request to a global network slice admission control function about the status change of the network slice parameter and receiving a response from the global network slice admission control function, said response comprising a result indication for the network slice parameter.

Another method of an admission control network function for managing a network slice parameter includes receiving a request from a proxy network slice admission control function, the request indicating a status change for a network slice parameter for admission control. The method includes determining whether a network slice global quota for the network slice parameter is reached and sending a response to the proxy network slice admission control function, said response comprising at least one of: a result indication or a new local quota for the network slice parameter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 10 is a flowchart diagram illustrating one embodiment of a second method for managing a network slice parameter.

DETAILED DESCRIPTION

Figure 1:
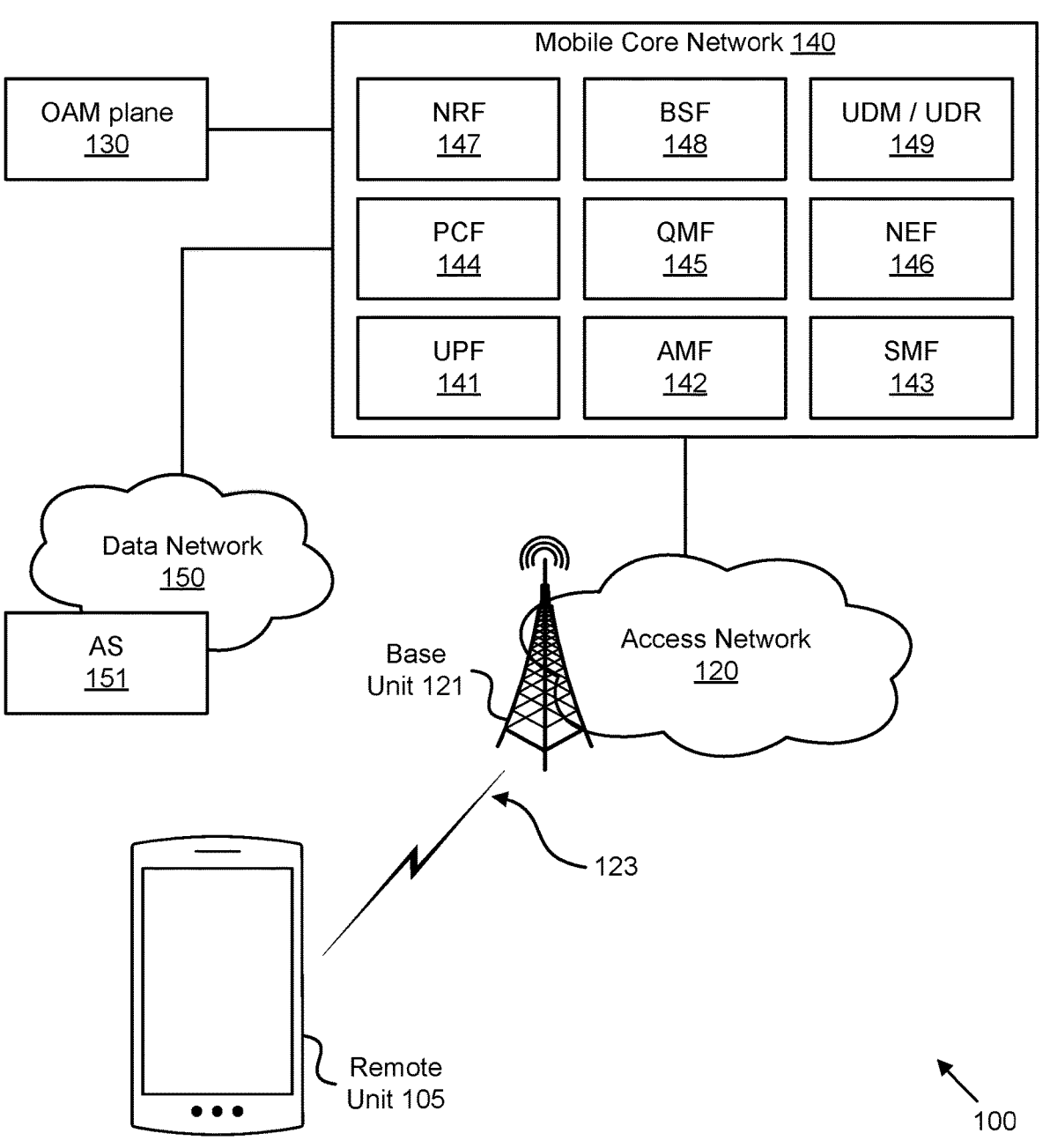
FIG. 1 is a block diagram illustrating one embodiment of a wireless communication system for managing a network slice parameter.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider (ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for network slice attribute management, for example managing a number of user (e.g., UEs) using the network slice and/or managing a number of data connections (e.g., PDU sessions) using the network slice. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

A network slice customer (e.g., a vertical or service provider) can negotiate or request network slice characteristics from the network operator deploying the network slice. The network slice characteristics may be identified by network slice attributes. A Generic Network Slice Template ("GST") is used by the network operator to derive the network slice characteristics.

One attribute in the GST is the "number of terminals," an attribute that describes the maximum number of terminals that can use the network slice simultaneously. This is an important input to scale the network slice and provides enough resources to the network slice. It is assumed that the GST "number of UEs per Network Slice" maps to the number of UEs registered to a S-NSSAI, i.e., the "Network Slice" from the GST template maps to S-NSSAI used in the Third Generation Partnership Project ("3GPP") specifications. Table 1 is one example of a definition for the "Number of terminals" attribute.

TABLE 1

| Number of Terminals Table | |
|---|---|
| Parameters | |
| Value | Integer |
| Measurement unit | N/A |
| Example | 100 000 terminals |
| | 10 000 000 terminals (sensors) |

TABLE 1-continued

| Number of Terminals Table | |
|---|---|
| Attribute Presence | |
| Mandatory Conditional Optional | X |

Another attribute in the GST is the "number of connections," an attribute that describes the maximum number of concurrent sessions supported by the network slice. This too is an important input to scale the network slice and provides enough resources to the network slice. It is a significant difference if the network slice is used to serve 10 users or 1,000,000 users simultaneously. It is assumed that the number of "connections" from the GST template can be mapped to Protocol Data Unit ("PDU") Sessions as known from the 3GPP specifications. Table 2 is one example of a definition for the "Number of connections" attribute.

TABLE 2

| Number of Connections Table | |
|---|---|
| Parameters | |
| Value | N/A |
| Measurement unit | 100 000 sessions |
| | 10 000 000 sessions |
| Example | Scalability attribute |
| Attribute Presence | |
| Mandatory Conditional Optional | X |

Another network slice attributed specified by GSMA are "Maximum downlink throughput" and "Maximum uplink throughput." The Maximum downlink throughput attribute defines the maximum data rate supported by the network slice in downlink. These parameters can be used to offer different network slice contract qualities level, e.g., Gold, silver and bronze which have different maximum throughput values applied to both Guaranteed Bit Rate ("GBR") and non-GBR traffic. Table 3 is one example of a definition for the "Maximum downlink throughput" attribute.

TABLE 3

| Maximum downlink throughput Table | |
|---|---|
| Parameters | |
| Value | Integer |
| Measurement unit | kbps |
| Example | 100 Mbps |
| | 20 Gbps |
| Tags | Scalability attributes |
| | KP |
| Attribute Presence | |
| Mandatory Conditional Optional | X |

The Maximum uplink throughput attribute defines the maximum data rate supported by the network slice in uplink. These parameters can be used to offer different network slice contract qualities level, e.g., Gold, silver and bronze which have different maximum throughput values applied to both GBR and non-GBR traffic. Table 4 is one example of a definition for the "Maximum uplink throughput" attribute.

TABLE 4

| Maximum uplink throughput | |
| --- | --- |
| Parameters | |
| Value | Integer |
| Measurement unit | kbps |
| Example | 100 Mbps |
| | 20 Gbps |
| Tags | Scalability attributes |
| | KP |
| Attribute Presence | |
| Mandatory | |
| Conditional | X |
| Optional | |

Disclosed herein are network functions ("NFs") which are responsible for at least: a) being aware that one or more network slice attributes to be monitored and possible quotas which need to be enforced; b) collecting information about the network slice attributes to be monitored; and considering roaming aspects when managing the network slice attribute(s). Such NFs may be referred to as quota management functions, admission control functions, and the like.

The quota of maximum number of UEs or number of PDU Sessions using the network slice can be maintained in the business support systems ("BSS") in the network operator. The BSS system usually contains the data of the service-level agreements with the network operator's customers. The quota of maximum number of UEs or number of PDU Sessions can be also maintained in the operations support systems ("OSS"). Both BSS and OSS can dispose these parameters to the operations, administration, and management ("OAM"), which can configure the corresponding network functions (NFs) part of the network slice.

To support network slice attribute management, the below solutions describe how a quota management network functionality ("QMF") collects information about the current global number of monitored/controlled attribute(s). The "global" means considering the attribute use by all UEs registered with the network slice whereas the UEs can be registered in the home Public Land Mobile Network ("H-PLMN") and/or in any visited Public Land Mobile Network ("V-PLMN") (i.e., roaming case) where the network slice services are offered. Additionally, the below solutions describe how the QMF enforces policies (i.e., actions) when the current global number of controlled attribute(s) reaches the maximum allowed number (i.e., quota or threshold).

For efficient network slice attribute management, a dedicated network functionality for admission control manages (or monitors or keeps a count) of one or more network slice attributes per network slice, for which the monitoring/controlling of a slices attribute is required. For example, the dedicated network functionality can be the QMF, described in greater detail below. The dedicated network function can be stand-alone or can be co-located with another network function.

The network slice is identified by the S-NSSAI. The QMF may manage one or more of the S-NSSAI attributes (called also 'controlled slice attributes,' 'slice attributes' or 'parameters,' and shown as "AttributeID" in the signaling exchanges) per network slice:

Number of terminals, i.e., the number of UEs concurrently registering for a network slice;

Number of connections, i.e., the number of PDU Sessions concurrently established within a network slice associated with all Data Network Names ("DNNs");

Maximum uplink ("UL") throughput, i.e., maximum data rate supported by the S-NSSAI in uplink;

· Maximum downlink ("DL") throughput, i.e., maximum data rate supported by the S-NSSAI in downlink.

For each of the above attributes there can be one or more quotas of maximum number or upper bound (called just "quota" or "slice quota") in the remainder of this document. According to various embodiments of the disclosure, the QMF collects information from other CP NFs or OAM about the current status of the controlled slice attribute. In certain embodiments, the QMF uses a subscription model of data collection and uses local reporting quotas which trigger the reporting from the NFs to the QMF (in order to minimize the signaling). A central QMF may collect information from distributed QMFs, e.g., in roaming partners. A roaming interface between the distributed-QMF and central QMF is introduced.

In various embodiments, the QMF exchanges information with the AF or OAM system to A) report the quotas status for the controlled slice attribute, and/or B) receive policies to be applied while the quota is exceeded. Moreover, the QMF may create and send policy information (e.g., dynamic policy) to CP NFs (e.g., AMF, SMF, PCF, vQMF) to enforce an action when the quota of a network slice ("NS") attribute is consumed.

FIG. 1 depicts a wireless communication system 100 for managing a network slice parameter, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Furthermore, the UL communication signals may comprise one or more downlink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QOS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 142 that serves the RAN 120, a Session Management Function ("SMF") 143, a Policy Control Function ("PCF") 144, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 142 is responsible for termination of Non-Access Spectrum ("NAS") signaling, NAS ciphering & integrity protection, registration management, connection management, mobility management, access authentication and authorization, security context management. The SMF 143 is responsible for session management (i.e., session establishment, modification, release), remote unit (i.e., UE) Internet Protocol ("IP") address allocation & management, DL data notification, and traffic steering configuration of the UPF 141 for proper traffic routing.

The PCF 144 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 includes a Network Exposure Function ("NEF") 146 which is responsible for making network data and resources easily accessible to customers and network partners and a Network Repository Function ("NRF") 147 which provides Network Function ("NF") service registration and discovery, enabling NFs to identify appropriate services in one another and communicate with each other over Application Programming Interfaces ("APIs"). In some embodiments, the mobile core network 140 may also include an Authentication Server Function ("AUSF"), or other NFs defined for the 5GC. When present, the AUSF may act as an authentication server and/or authentication proxy, thereby allowing the AMF 142 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("cMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 143 and UPF 141. In some embodiments, the different network slices may share some common network functions, such as the AMF 142. The different network slices are not shown in FIG. 1 for ease of illustration, but their support is assumed.

The wireless communication system 100 includes an OAM/Management function 130. The OAM/Management function 130 may provide slice parameters (e.g., GSTs) to a QMF in the mobile core network 140. In various embodiments, the OAM/Management function 130 performs slice instantiation, e.g., in response to a request from a service provider.

The mobile core network 140 also includes at least one Quota Management network Function ("QMF") 145 and a Binding Support Function ("BSF") 148. The QMF 145 may be configured for monitoring (i.e., keeping count) of one or more network slice attributes per network slice, e.g., number of remote units 105 (e.g., UEs) or number of PDU Sessions using the network slice. This configuration can be: maintained in the UDM/UDR 149 (and it may be configured by the network operator, e.g., using the OAM 130); maintained the QMF 145 (this also may be configured via OAM 130); and/or may be requested by an AS 151 via NEF 146. The QMF 145 may be a stand-alone NF or may be co-located with another NF.

The BSF 148 is responsible for binding various sessions that originate on different interfaces in the network but share common criteria, for example sessions belonging to the same subscriber. The BSF 148 may be deployed where there are multiple PCFs 144 and/or charging function ("CHF") (described below) to enable network scaling. The BSF 148 may also perform session correlation for HTTP/2 and Diameter. In this function, the BSF 148 may track sessions that are located anywhere in the network, but share common criteria, such as subscriber identifiers.

While FIG. 1 depicts components of a 5G RAN and a 5G core network, the described embodiments for managing a network slice parameter apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 142 may be mapped to an MME, the SMF 143 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base station/base unit, but it is replaceable by any other radio access node, e.g., RAN node, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for managing a network slice parameter.

In some embodiments, a PLMN may have a global admission control function that manages a network slice attribute (also referred to as network slice parameter) for a network slice on a global level among various administrative domains of the PLMN and/or various V-PLMNs supporting a particular network slice with which the H-PLMN has a roaming agreement. The global admission control function determines whether a (global) slice quota for the network slice parameter is reached and enforces policy when the slice quota is reached.

In some embodiments, one or more proxy admission control functions may be deployed in the various administrative domains and/or various V-PLMNs, where a proxy admission control function monitor the status of the network slice parameter relative to a local quota. Here, the local quota is a portion of the slice quota apportioned to the administrative domain or V-PLMN. In certain embodiments, the sum of all local quotas is equal to the slice quota.

Figure 2:
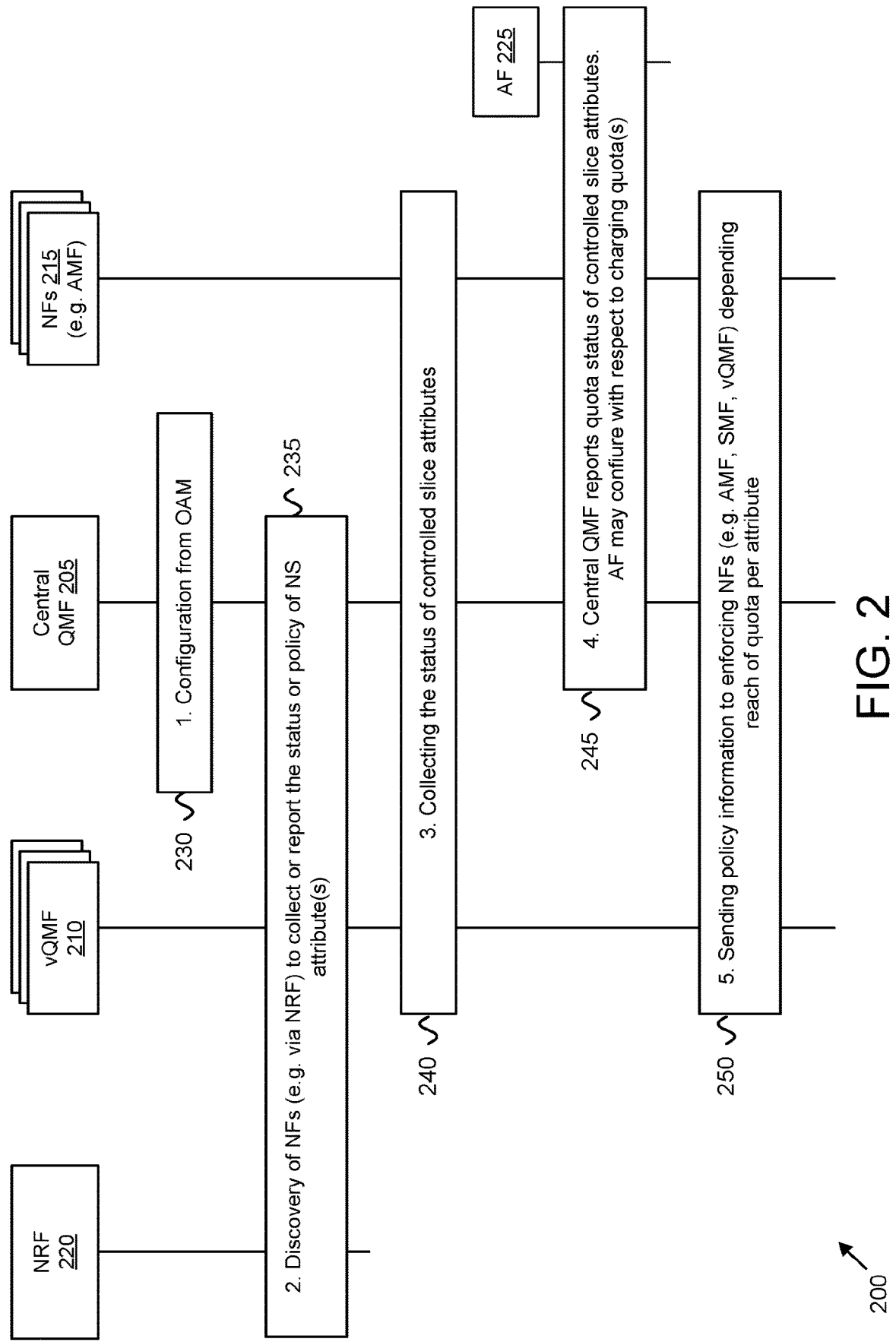
FIG. 2 is a diagram illustrating one embodiment of managing a network slice attribute.

FIG. 2 depicts a high-level procedure 200 for controlling a network slice attribute, i.e., managing the quota of the network slice attribute. The QMF may be deployed as central QMF instance 205 and as distributed QMFs instances, each of which may be embodiments of the QMF 145. The central QMF 205 (also referred to as a global QMF or global network slice admission control function) is responsible to manage/control the global status and/or quota of a controlled slice attribute, where "global" means all non-roaming and roaming UEs using the network slice resources.

The distributed QMFs (denoted "vQMF" 210) may be deployed in the same network (i.e., home network, e.g., H-PLMN, with which the slice customer has Service-Level Agreement ("SLA")) and/or in roaming partners networks (i.e., visited networks, e.g., V-PLMN). The vQMFs 210 (also referred to as proxy QMFs or proxy network slice admission control functions) are responsible to manage local quotas, i.e., collecting data from other NFs 215 and enforcing policies for local quotas. The central QMF 205 is responsible to manage the local quotas in the distributed QMF instances. The local quotas configured in the vQMFs 210 can be either reporting quotas (see step 3a/3b in FIG. 3A, below) or enforcing quotas. The enforcing quotas are meant to start enforcing a policy when the quota is reached. The detailed description of the steps of FIG. 2 is as follows:

At Step 1, the central QMF 205 is configured by the operations, administration and management ("OAM") system to control/manage particular network slice attribute(s) for a network slice identified by S-NSSAI (see block 230). The OAM system is aware about the requirement to control a quota of a network slice attribute from the service level agreement ("SLA") or other contracts between the network operator and the network slice customer. For example, a combination and particular values of the GST parameters may result in a specific Network Slice Type ("NEST") and further used by the OAM system to create a Network Slice Template ("NST"). The OAM system may determine the configuration of the central QMF 205 based on the NST.

At Step 2, the central QMF 205 may determine which NFs 215 are responsible for managing the particular controlled slice attribute (see block 235). For example, if the controlled slice attribute is number of UEs concurrently registering for a network slice, the central QMF 205 determines that the AMFs serving the corresponding S-NSSAI needs to be discovered. Alternatively, this information may be directly configured in the central QMF 205 by the OAM in Step 1.

Examples of control plane NFs 215 may be AMF, SMF, PCF, which report to the central QMF 205 and can be also an enforcement policy point when a quota has been consumed. The central QMF 205 may discover these NFs 215 by interrogating with the NRF 220, which may be one embodiment of the NRF 147.

The central QMF 205 may also exchange with other (e.g., distributed) QMFs in one of the following cases:

a. when the network covers a large territory and distributed QMFs are used for scalability (i.e., each covering an administrative domain in the territory); or
  b. when the network slice is used by roaming UEs (i.e., the network slice spans at least two networks: the one is the home, and the other is the visited network).

As noted above, the distributed QMF instances may be also called "visited QMF" ("vQMF") in case b) above, where a roaming interface between the home QMF ("hQMF") and the visited QMFs ("vQMFs") is introduced.

At Step 3, the central QMF 205 collects information about the status of the controlled slice attributes of one or multiple slices (see block 240). The status of the controlled slice attributes information is collected from the NFs identified in step 2 above, i.e., either directly from the AMFs/SMFs or indirectly from the vQMFs, whereas the vQMFs obtain the status from the AMFs/SMFs.

At Step 4, the central QMF 205 may interrogate with an application AF 225 (e.g., via NEF) to report the slice quota status (see block 245). The central QMF 205 may report the status of controlled slice attributes with respect to charging quota(s) which may be configured in the central QMF 205 by the OAM in step 0, or the AF 225 may have subscribed for notifications for certain quota levels in advance. Optionally, the central QMF 205 may report the quota status to the OAM system (management system) and the OAM system can create (or configure or update) the policies to be enforced when the quota status is reached.

At Step 5, based on the reached quota of a slice attribute in the central QMF 205, the central QMF 205 may create and send policy information (i.e., dynamic-policy configuration) to the vQMFs 210 and policy-enforcing NFs 215 (e.g., AMF, SMF, PCF, etc.) in the 5GC control plane (see block 250). The policy can enforce actions in the vQMFs 210 and policy-enforcing NFs 215 such as start rejecting new UEs or new PDU Sessions; or throttle the data rate of the UEs using the S-NSSAI. The policy may be applicable depending on various conditions, e.g., type of UEs, type of subscribers, whether the UEs has a different default subscribed S-NSSAI, etc.

One benefit of the procedure shown in FIG. 2 is that the signaling on the network slice level, i.e., not on per-UE level. Using network-slice-level signaling it is expected that the signaling minimized compared on the per UE-level signaling. Further, the central status and quota of controlled slice attribute is managed centrally in the central QMF 205, which allows the central QMF 205 to enforce policy (e.g., configure policy) in other NFs 215 to enforce particular action (e.g., start/end rejecting new UEs or new PDU Sessions).

According to embodiments a first solution, a QMF creates policy when slice quota is consumed. In this solution, the QMF creates a policy and sends the policy (or actions to be perform) to enforcement point NFs (i.e., policy-enforcing NFs) when the network slice attribute quota has been consumed. In other words, the QMF sends requests (including creating, updating and deleting a policy) to the enforcement point NFs to start, update or stop an action. The enforcement point NFs (i.e., policy-enforcing NFs) can be one of:

AMF when the controlled slice attribute is either the number of UEs registered with S-NSSAI, or the number of PDU Sessions established in an S-NSSAI SMF when the controlled slice attribute is either the number of PDU Sessions established in an S-NSSAI, or the maximum UL or DL throughput (i.e., data rate supported by the S-NSSAI in UL or DL)

PCF when the controlled slice attribute is the maximum UL or DL throughput (i.e., data rate supported by the S-NSSAI in UL or DL)

Figure 3A:
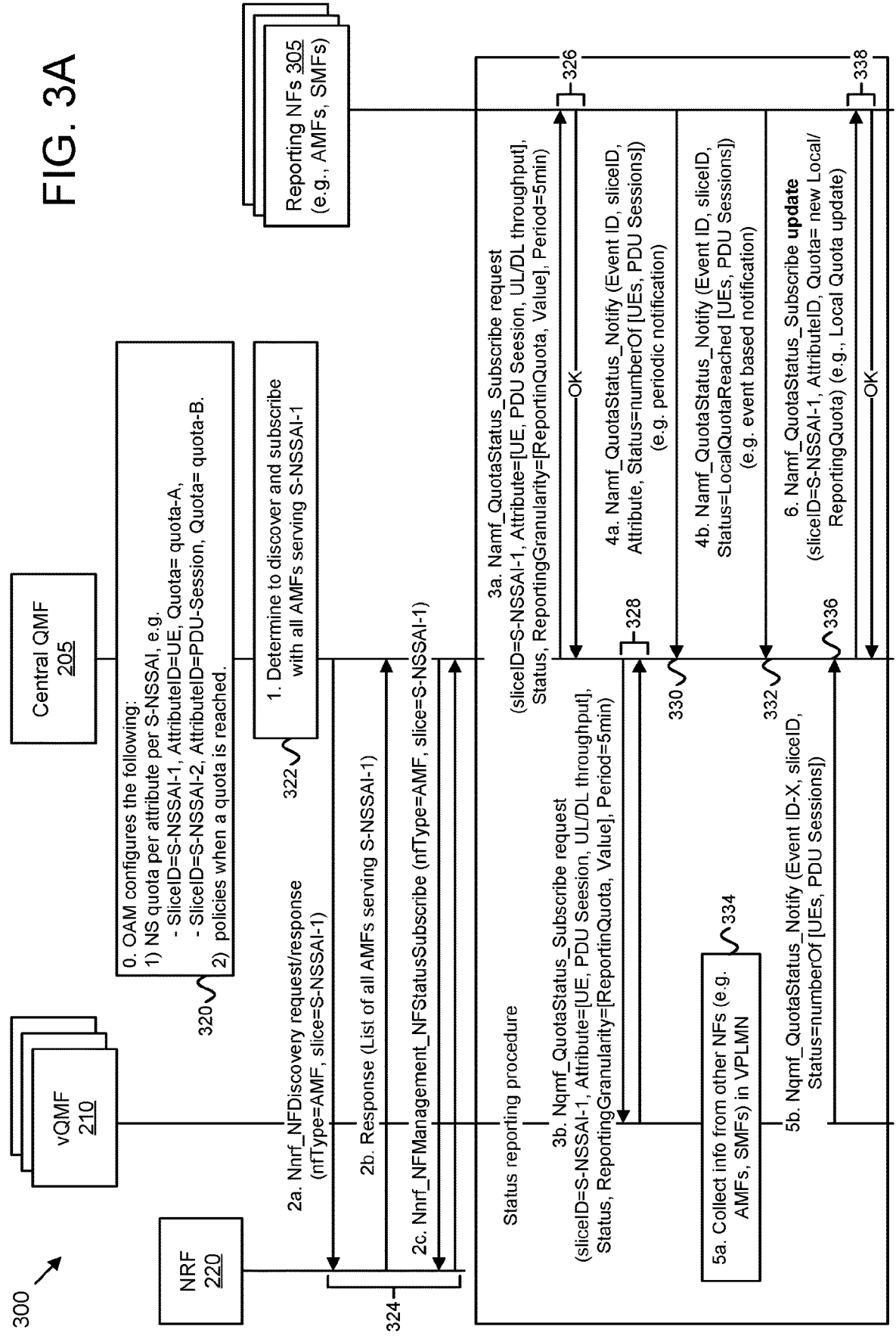
FIG. 3A is a diagram illustrating one embodiment of detailed signaling flow for controlling the quota of slice attribute using Quota Management Function ("QMF") created policy.
Figure 3B:
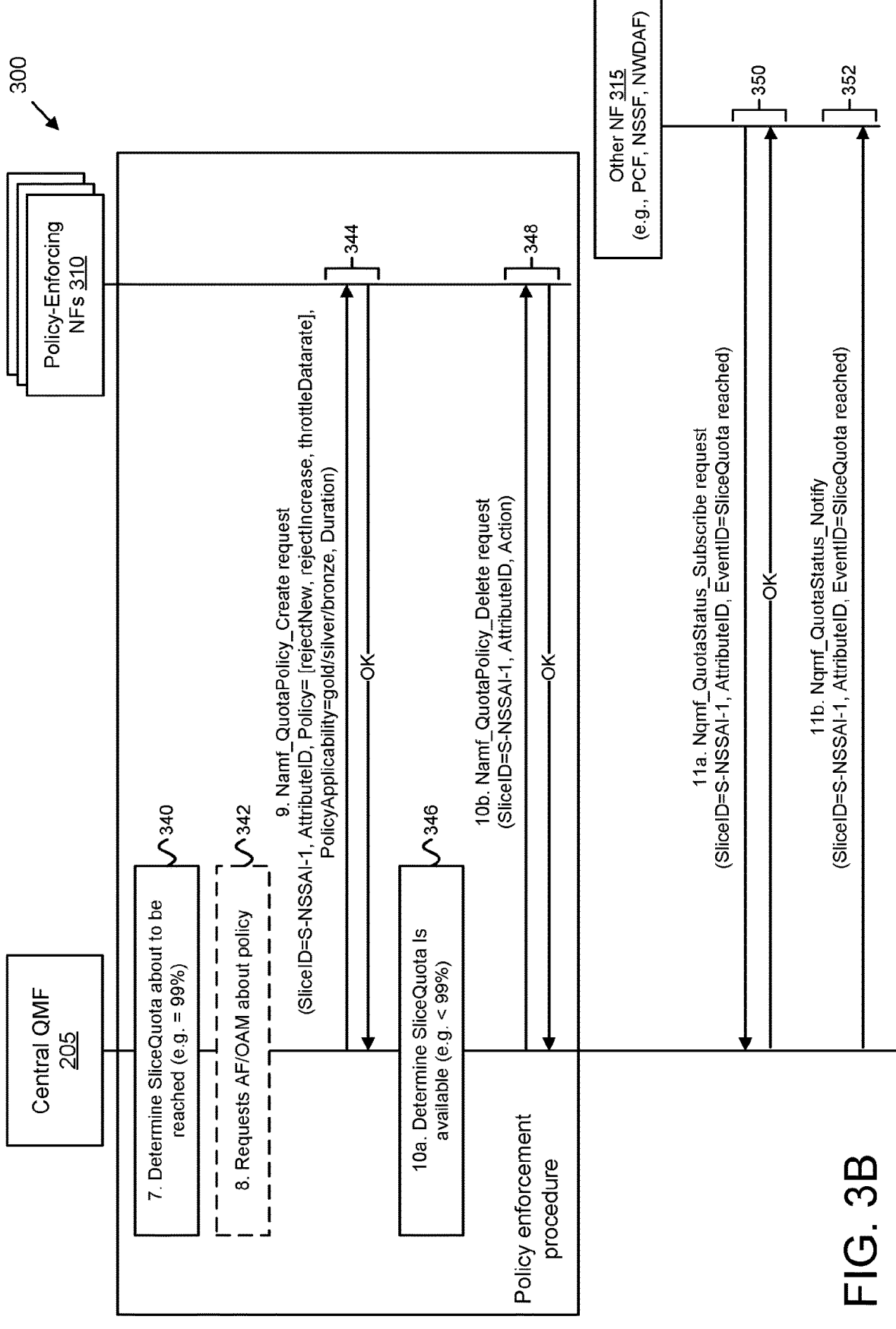
FIG. 3B is a continuation of FIG. 3A.

FIGS. 3A-3B depict an exemplary call-flow for a procedure 300 detailing certain steps from FIG. 2. The procedure 300 involves the central QMF 205, one or more vQMFs 210, a NRF 220, a set of reporting NFs 305 which are involved in the reporting the current status of the slice attribute to the central QMF 205 and a set of policy-enforcing (or service-consumer) NFs 310, e.g., AMF, SMF or PCF, to which the central QMF 205 sends the policy when the network slice attribute quota has been consumed. In various embodiments, for the same slice attribute the reporting NF(s) 305 and the policy-enforcing (e.g., QMF service-consumer) NF(s) 310 are the same NF (e.g., the AMF in case the slice attribute is number of UEs (or PDU Sessions) registered in S-NSSAI; or the SMF in case the slice attribute is number of PDU Sessions established in S-NSSAI). However, in case of certain slice attributes, e.g., maximum UL throughput or maximum DL throughput, the reporting NF 305 may be SMF, whereas the policy-enforcing NF may be the PCF.

The procedure 300 includes a status reporting phase (i.e., comprising steps 3-6) and a policy enforcement phase (i.e., comprising steps 7-10). The status reporting phase/procedure is used by the central QMF 205 to collect information about the current status of the slice parameter from the reporting NFs 305. The central QMF 205 may configure flexibly the reporting events or reporting frequency in the reporting NFs 305. The policy enforcement phase/procedure is used by the central QMF 205 to configure the policy information to be applied by the policy-enforcing NFs 310 while the global network slice quota is exceeded. The detailed description of the FIGS. 3A-3B is as follows:

Beginning on FIG. 3A, at Step 0, the central QMF 205 is configured by the operations, administration and management ("OAM") system to control/manage particular network slice attribute(s) for a network slice identified by S-NSSAI-1 (see block 320). At least one of the following information may be configured in the QMF:

1) network slice quota per attribute per S-NSSAI: e.g., UE quota-A for S-NSSAI-1, PDU Sessions quota-B for S-NSSAI-1, PDU Sessions quota-C for S-NSSAI-2, etc. For example, such configuration can be formatted as a tuple:

Slice ID: <S-NSSAI-1>

Attribute ID: <UEs, PDU Sessions, Throughput UL/DL, etc.>

Quota: value 2) policies to be applied when a quota of an attribute is reached. For example, the policy can be to report to the application function ("AF") or to start rejecting increase of the slice attribute usage in the S-NSSAI-1.

At Step 1, based on the configuration in step 0, the central QMF 205 may determine which reporting NFs 305 are responsible for managing the particular slice attribute to be controlled (see block 325). For example, if the number of UEs concurrently registering for a network slice should be controlled, the central QMF 205 determines that the AMFs serving the corresponding S-NSSAI needs to be discovered. In this case the central QMF 205 discovers all AMFs configured to serve the S-NSSAI-1 by interrogating with the NRF 220.

At Step 2, the interrogation with the NRF 220 is shown in steps 2a, 2b and 2c (see messaging 330). In step 2c, the central QMF 205 may subscribe with the NRF 220 to be notified if a new AMF, which serves the specific S-NSSAI-1, registers with the NRF 220.

If the controlled slice attribute is the number of UEs concurrently registering for the S-NSSAI-1, the central QMF 205 may discover and request the AMFs serving S-NSSAI-1 to collect information. If the controlled slice attribute is the number of PDU Sessions concurrently established within the S-NSSAI-1, the central QMF 205 may discover and request the AMFs or SMFs serving S-NSSAI-1 to collect the information. If the controlled slice attribute is the UL or DL data throughput in the S-NSSAI-1, the central QMF 205 may discover and request the SMFs or PCFs serving S-NSSAI-1 to collect the aggregates current data rate.

At Step 3a, the central QMF 205 subscribes with the reporting NFs 305 to collect information about the status of the controlled slice attribute (see messaging 335). For this purpose, a new service (e.g., Namf_QuotaStatus) exposed by the AMF, SMF or vQMF 210 may be introduced. Alternatively, an existing service (e.g., Namf_EventExposure) can be used and a new EventID may be introduced, e.g., EventID being the number of attribute (e.g., UEs, PDU Sessions, or throughput) and an Event Filter. The service offered/exposed by the AMF requires the AMF to count number of [UEs, PDU Sessions] per slice served by the AMF.

In case of a new service, the following message can be sent from the central QMF 205 to the reporting NFs 305: Namf_QuotaStatus_Subscribe request (sliceID=S-NSSAI-1, AttributeID, Status, ReportingGranularity, Period=5 min). The meaning of the parameters is described as follows:

The parameter "sliceID" may identify the S-NSSAI of the network slice subject of quota monitoring, e.g., S-NSSAI-1. The parameter "AttributeID" may identify the controlled slice attribute which should be monitored, e.g., number of UE, number of PDU Sessions, or UL/DL data throughput. The parameter "Status" may identify an Event Reporting Information. This is used in the case of periodic reporting. Alternatively, the parameter "Status" may identify current status of attribute.

The parameter "ReportingGranularity" may identify an event based reporting to the QMF. The event-based reporting can be based on local reporting quota 'Reportingquota' (e.g., reaching 100 UEs or PDU Sessions; or 50 Mbps UL/DL throughput). The reporting quota values may be different to different reporting NFs 305. In principle, the sum of all reporting quota values sent to the reporting NFs 305 should be equal or smaller than the global quota. In other words, the central QMF 205 splits the global quota into multiple reporting quotas which are sent to the reporting NFs 305; or on granularity or change of current status of the attribute.

For example, if the "ReportingGranularity" is set to "2", this means if the current status number in the reporting NF 305 changes by 2 (e.g., 2 UEs which leave or perform new registration or deregistration in the AMF), the event-based reporting/notification is triggered. In other words, the current status of the attribute increases or decreases by 2. In case of UL/DL throughput attribute, the "ReportingGranularity" can be expressed in increase or decrease by e.g., 2 Mbps.

When the "ReportingGranularity" is sent to "1", the reporting NF 305 should send a notification to the QMF for new registered UEs, or new established PDU Sessions or new increased UL/DL throughput. The term "new" is meant for UEs which perform Registration procedure and include the S-NSSAI-1 as a new requested S-NSSAI, or establish a "new" PDU Session to the S-NSSAI-1. If a UE moves from one AMF to another (e.g., inter-AMF mobility), the AMF may not immediately send notification to the QMF, as the status of the attribute would be reduced in one NF (e.g., source AMF) and increased in another NF (e.g., target AMF).

The parameter "Period" may identify the periodicity of reporting sent to the QMF, e.g., every 5 minutes. Analogically, if the QMF requests reporting from the SMF, either a new service Nsmf_QuotaStatus may be introduced or an existing Nsmf_Event_Notification service may be used.

At Step 3*b*, similar to step 3*a*, the central QMF 205 may subscribe with the distributed vQMFs 210 (e.g., in the same PLMN or in visited PLMNs) to collect information about the status of the controlled slice attribute (see messaging 340). The message sent to the vQMFs 210 is the similar as in step 3*a*, but the service name may be different. For example, the service can be called Nqmf_QuotaStatus_Subscribe, which means that the inter-QMF interface may be based on services similar to the services between the central QMF 205 and the reporting NFs 305, such as AMF or SMF. If the central QMF 205 determines to apply event-based reporting, the central QMF 205 may send to the vQMFs 210 reporting quota values different from reporting quota values sent to the reporting NFs 305 in step 3*a*.

At Step 4*a*, the reporting NFs 305 (e.g., AMF, SMF) locally monitor/counts the configured slice attribute. The reporting NFs 305 can count the UEs or PDU Sessions or UL/DL throughput. If the reporting timer is configured, the reporting NFs 305 send periodic notifications (see messaging 345).

For example, in the case that a reporting NF 305 is AMF, the notification to the central QMF 205 may be Namf_QuotaStatus_Notify (Event ID, sliceID, AttributeID, Status=numberOf[UEs, PDU Sessions]). The AMF reports according to the configuration in step 3*a*, e.g., either 1) the current number of all UEs registered with the S-NSSAI-1, or 2) the current number of all PDU Sessions established with the S-NSSAI-1.

At Step 4*b*, if event-based notifications are configured based on the parameter "ReportingGranularity" from step 3*a*, the reporting NF 305 sends notification if the event occurs (see messaging 350). For example, if a local reporting quota 'ReportingQuota' (e.g., reaching 100 UEs or PDU Sessions) has been configured in step 3*a*, if the attribute (i.e., UEs or PDU Sessions) reach the reporting quota, the reporting NF 305 sends a notification e.g., "Status=LocalQuotaReached" to the central QMF 205.

At Step 5*a*, the vQMFs 210 count/collect/monitor information about the status of a slice attribute (see block 355). If the vQMFs 210 determine that a configured reporting quota of the slice attribute is reached, then at Step 5*b*, the vQMF 210 sends a notification to the central QMF 205 (see messaging 360). Alternatively, the vQMF 210 may send periodic reports to the central QMF 205. The notification messages are similar to the one in steps 4*a* or 4*b*, but a different service can be used, e.g., Nqmf_QuotaStatus_Notify, which is offered by the vQMF 210.

Note that steps 3*b*, 5*a* and 5*b* show that in general the central QMF 205 can subscribe for the reporting/notification from other QMFs, but also the central QMF 205 may send notifications/reports to other QMFs. In other words, the QMFs may be configured in hierarchical manner like a primary QMFs and secondary/distributed QMFs.

At Step 6, the central QMF 205 may determine that the reporting quotas configured in steps 3*a* or 3*b* needs to be update. In such case, the QMF may send Nnf_QuotaStatus_Subscribe update request (sliceID=S-NSSAI-1, AttributeID, Quota=new Local/ReportingQuota), where the Nnf may be Namf or Nsmf service (see messaging 365). This step may be required when the central QMF 205 determines, e.g., based on the reports/notification received in steps 4*a*/4*b*/5*b*, that some NFs maintain fewer number of slice attribute status than other NFs. Then the central QMF 205 may determine to re-distribute the reporting quotas or in general to adapt the reporting granularity in the reporting NFs 305 and vQMFs 210.

When the global quota is about to be reached in the central QMF 205, the central QMF 205 may configure the reporting NFs 305 (or vQMFs 210) with fine-granular "ReportingGranularity." For example, the reporting NFs 305 (or vQMFs 210) have to report by each change of the status of the slice attribute, e.g., the "ReportingGranularity" may use granularity set to "1". Refer to steps 3*a* to 4*b* for further details.

Continuing on FIG. 3B, at Step 7, the central QMF 205 collects information about the status of the slice attribute. The reports received by the central QMF 205 man be event-based or periodic. In certain embodiments, different quotas for roaming and non-roaming UEs may be applied, i.e., the quota for the roaming UEs (e.g., served by the vQMFs 210) may be reached while the quota of the non-roaming UEs (i.e., served by the AMFs or SMFs in the H-PLMN) may not be reached.

If the current status of the slice attribute is about to reach a level of the maximum number (e.g., pre-configured in step 0; see also block 340), the central QMF 205 may start a policy creation. In certain embodiments, there may be a hysteresis of the thresholds applied in the central QMF 205 to determine "quota reached" event threshold or "quota available again" event threshold. For example, the central QMF 205 may determine a "quota reached" event when the quota is consumed by 99%, and the central QMF 205 may determine "quota available again" event when the quota is consumed below than 95%. Such hysteresis can be either based on local configuration in the central QMF 205 or configured by the OAM system.

Figure 6A:
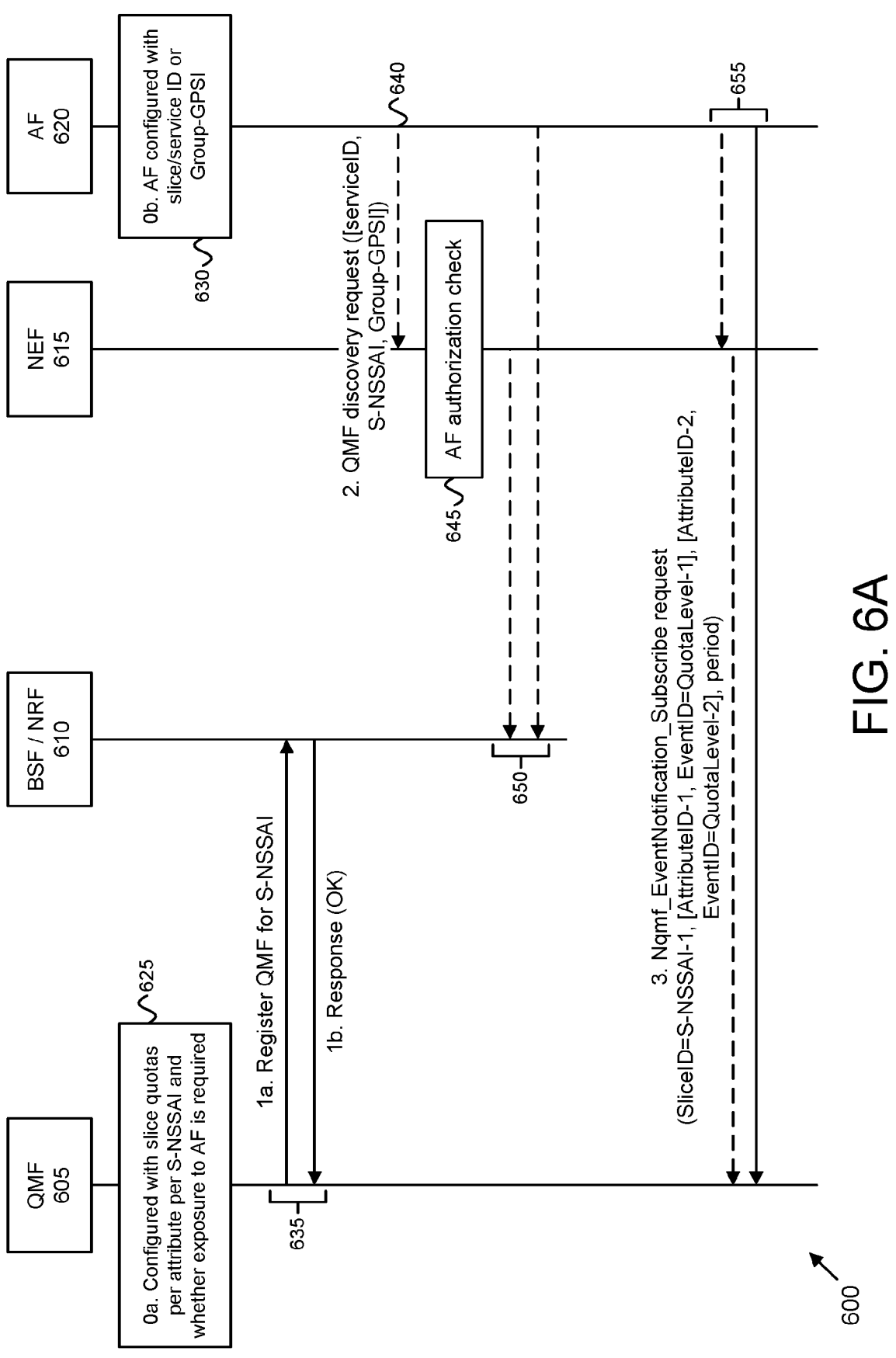
FIG. 6A is a diagram illustrating one embodiment of a procedure for an Application Function ("AF") to subscribe for slice quota status in the QMF.
Figure 6B:
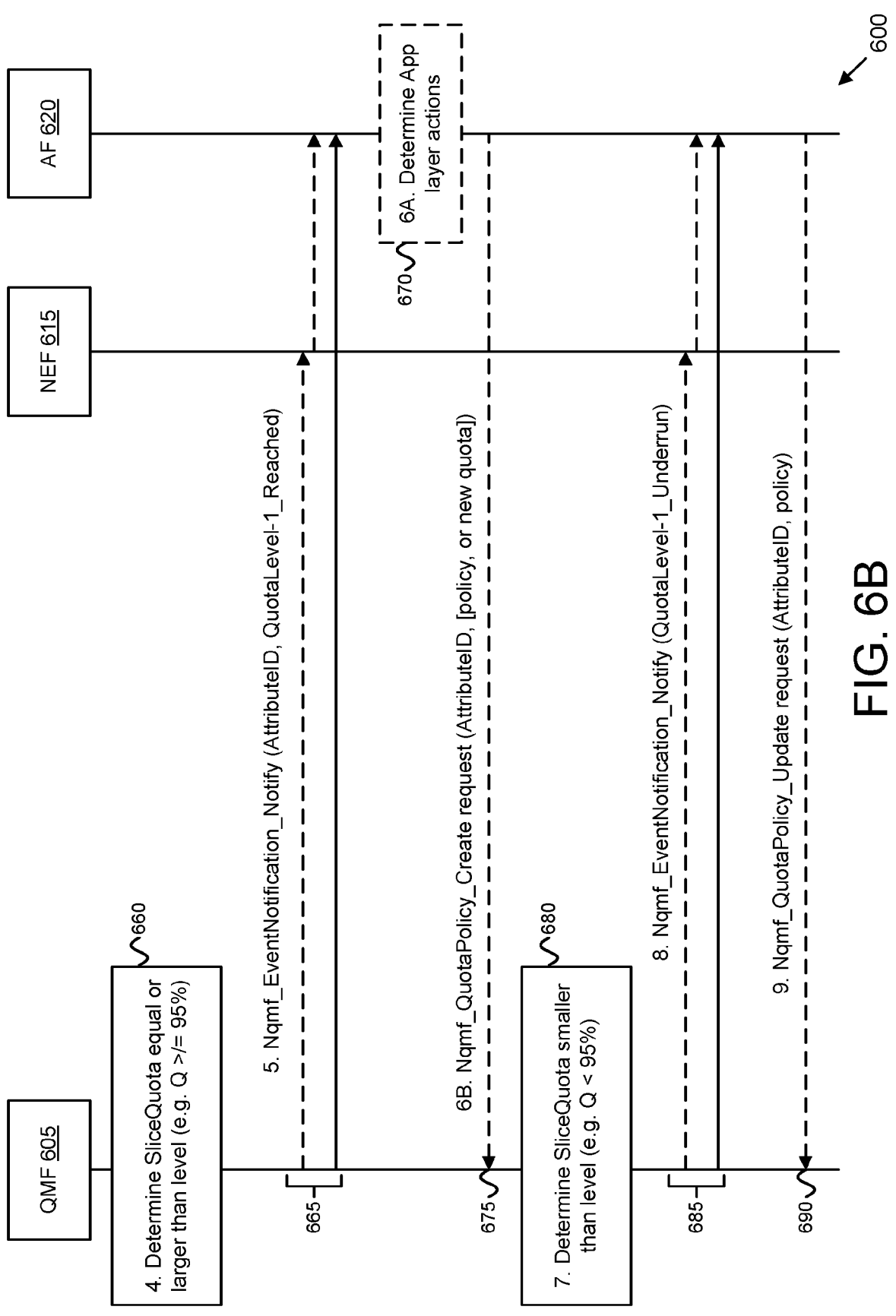
FIG. 6B is a continuation of FIG. 6A.

At Step 8, conditionally (i.e., if the AF has subscribed in advance), the central QMF 205 may report to the AF or the OAM system about status of the slice quota, or to request whether the current quota is still valid (see block 342. The signaling exchange between central QMF 205 and AF is shown in FIGS. 6A-6B.

At Step 9, the central QMF 205 creates a policy information (or also referred as dynamic-policy or "action") to be applied during the global quota is exceeded. The central QMF 205 sends the policy information to policy-enforcing NFs 310 (e.g., AMF, SMF, or PCF) (see messaging 344). Note that the central QMF 205 may also send the policy information to the vQMFs 210.

In some embodiments, the central QMF 205 may send the following message to the policy-enforcing NFs Namf_QuotaPolicy_Create request (SliceID=S-NSSAI-1, AttributeID, Policy=[rejectNew, rejectIncrease, throttleDatarate], PolicyApplicability-gold/silver/bronze, Duration). Here, the service name "QuotaPolicy_Create" denotes that a policy for a slice quota is created, but also alternative names like "Quoty Management."

The parameter "PolicyID" identifies the policy/action to be enforced, which depends on the controlled slice attribute. Examples of policy/action to be enforced include, but are not limited to, the following:

First, if the slice attribute is number of UEs registered with S-NSSAI, the policy may be to reject request(s) for new registration to the S-NSSAI-1, whereas "new" means the UEs which perform a new registration to the S-NSSAI-1. This policy may be enforced in the AMF. If a UE registered to S-NSSAI-1 moves from a source AMF to a target AMF (e.g., inter-AMF mobility), the target AMF does not reject the UE, as the global count/status of the slice attribute does not change, i.e., only the local status in the source AMF and target AMF changes.

Second, if the slice attribute is the number of PDU Sessions established in an S-NSSAI, the policy may be to reject request(s) for new PDU Session establishment, whereas "new" means that a new PDU Session to the S-NSSAI-1 is to be established. For example, the policy of PDU Session rejection can be performed/enforced in the AMF or SMF.

Third, if the slice attribute is the UL/DL throughput per S-NSSAI, the policy may be to not increase the UL/DL data rate for the S-NSSAI-1, i.e., to reject request(s) for new increase of the UL/DL data rate in S-NSSAI-1. This may mean to reject requests for PDU Session Modification to increase the data rate, or reject requests for new PDU Session establishment to the S-NSSAI-1. This policy can be enforced in the SMF or PCF.

The parameter "Policy Applicability" may identify for which UE subscription types the policy/action is to be applied. For example, if the UESubscriptionType=bronze+ silver means that the policy is to be applied to all UEs with bronze and silver subscription, but the policy does not apply to UEs with gold subscription. Alternatively, the "Policy Applicability" may identify that the policy in only to be applied to UEs with multiple S-NSSAI registrations, but if the UE is only registered to a single S-NSSAI, the policy is not applied. One further example for "PolicyApplicability" is that the policy may be applicable to UEs which are registered to S-NSSAIs or have default S-NSSAI different from the specific S-NSSAI, for which the policy applies.

The parameter "Duration" may identify the time duration for the policy applicability.

The policy created by the central QMF 205 may depend on the level of the quota. For example, if the slice quota has reached 90%, apply policy 1; whereas if the slice quota has reached 95%, apply policy 2; and if the slice quota has reached 99%, apply policy 3. Policy 1 may be to reject 'bronze' subscribers; policy 2 may be to reject 'bronze' and 'silver' subscribers, and policy 3 may be to reject all types of subscribers (e.g., including 'gold' subscribers).

Analogically, if the central QMF 205 sends policy information (or action information) to the SMF, the service Nsmf_QuotaPolicy_Create/Update/Delete may be introduced, which is not shown in the figure. As described above, the central QMF 205 may also send policy information (or action information) to be applied to the vQMFs 210 and a corresponding Nqmf_QuotaPolicy_Create/Update/Delete service can be introduced, which is not shown in the figure.

At Step 10a, the central QMF 205 continues to monitor the current status of the slice attribute to determine when the slice attribute is available again (see block 346). At Step 10b, when the central QMF 205 determines that the current status of the slice attribute falls below a threshold (e.g., the available slice quota is below 99%), the central QMF 205 may send policy information to policy-enforcing NFs 310 (e.g., AMF, SMF, or PCF) to delete or update the policy in the policy-enforcing NF 310 (see messaging 348). For example, the central QMF 205 may send to the enforcing NF Nnf_QuotaPolicy_Delete request (SliceID=S-NSSAI-1, AttributeID), whereas the "Nnf" may be Namf, Nsmf, Nqmf or Npof service.

At Step 11, it is possible that other NFs 315 (i.e., different from reporting NFs or policy-enforcing NFs) from the 5GC may make the use of the status information collected in the central QMF 205. Such NFs 315 may subscribe with the central QMF 205 to be notified if a specific quota for a slice attribute is reached (see messaging 350). Such NFs 315 may be a PCF, a Network Slice Selection Function ("NSSF") or a network data analytics function ("NWDAF"). The NFs may use an EventExposure service (e.g., Nqmf_EventExposure) or a new service (Nqmf_QuotaStatus) may be introduced.

For example, when the NF(s) 215 use a new service Nqmf_QuotaStatus, the NF(s) may send to the central QMF 205 a message Nqmf_QuotaStatus_Subscribe request (SliceID=S–NSSAI-1, AttributeID, EventID-SliceQuota reached). The parameter EventID may identify the event, upon which the central QMF 205 sends a notification message. The NF(s) 215 may not be aware about the slice quota and the slice quota is configured in the central QMF 205 (as per step 0).

Step 11b shows that if the slice quota is reached (i.e., similar as described in Step 7), the central QMF 205 may send Nqmf_QuotaStatus_Notify (SliceID=S-NSSAI-1, AttributeID, EventID=SliceQuota reached) to the subscribed NF(s) 215 (see messaging 352). If the slice is available again, the central QMF 205 may send a new notification indicating that the slice quota is available again.

Benefits of this procedure is that the collection of current status in the central QMF 205 (Steps 3-6) is performed on network slice level. The method for sending the notifications from the reporting NFs 305 to the central QMF 205 is flexible and can be adapted depending on how close the current status is to the maximum number (or quota). For example, the central QMF 205 can configure the reporting NFs 305 to report for each new UE or new PDU Session increase or decrease in the S-NSSAI-1. Further, the sending of the policy information to the policy-enforcement NFs 310 (e.g., AMF, SMF, PCF) and vQMFs 210 is also performed on network slice level (i.e., to avoid performing per UE-level signaling). Further, the central QMF 205 may implement a logic to determine to which policy-enforcing NFs 310 and vQMFs 210 the policy information is sent when the quota is consumed.

The step 8 from FIG. 3B shows that the central QMF 205 may exchange signaling with the AF for several reasons. Further details of the method performed in step 8 are elaborated in FIGS. 6A-6B.

According to embodiments of a second solution, the AMF/SMF maintains pre-configured local policy or action to be performed when the quota is consumed. In this solution, it is assumed that the NFs (mainly the policy-enforcing NFs, e.g., AMF, SMF, PCF or vQMF) are (pre-) configured with the action to be performed when slice quota is reached. In other words, there is no need to dynamically create, update and delete a policy in the policy-enforcing NFs (e.g., AMFs/SMFs) when the quota is reached. The (pre-)configuration of the policy-enforcing NFs may be done from the OAM system. The policy-enforcing NF(s) subscribe with or request the QMF to be informed about particular events (e.g., when the quota is reached, or quota is available again). In this sense the policy-enforcing NF(s) may be described as QMF service-consumer NFs, as they consume the Event Exposure (or "status notification" or "quota limit" or "request/response") service offered by the QMF. The policy-enforcing NF(s) are configured what action to perform (e.g., reject the UE or PDU Session) when the event is notified from the QMF (e.g., in response message the QMF sends a result whether the maximum number of UEs or PDU Sessions is reached).

The QMF (e.g., main QMF or distributed QMFs) is configured with the corresponding quotas (e.g., maximum number) per network slice parameter (e.g., configured by the OAM system). The QMF is responsible to collect the information about the current slice attribute status and also to notify the NF(s) when the quota is reached.

Figure 4:
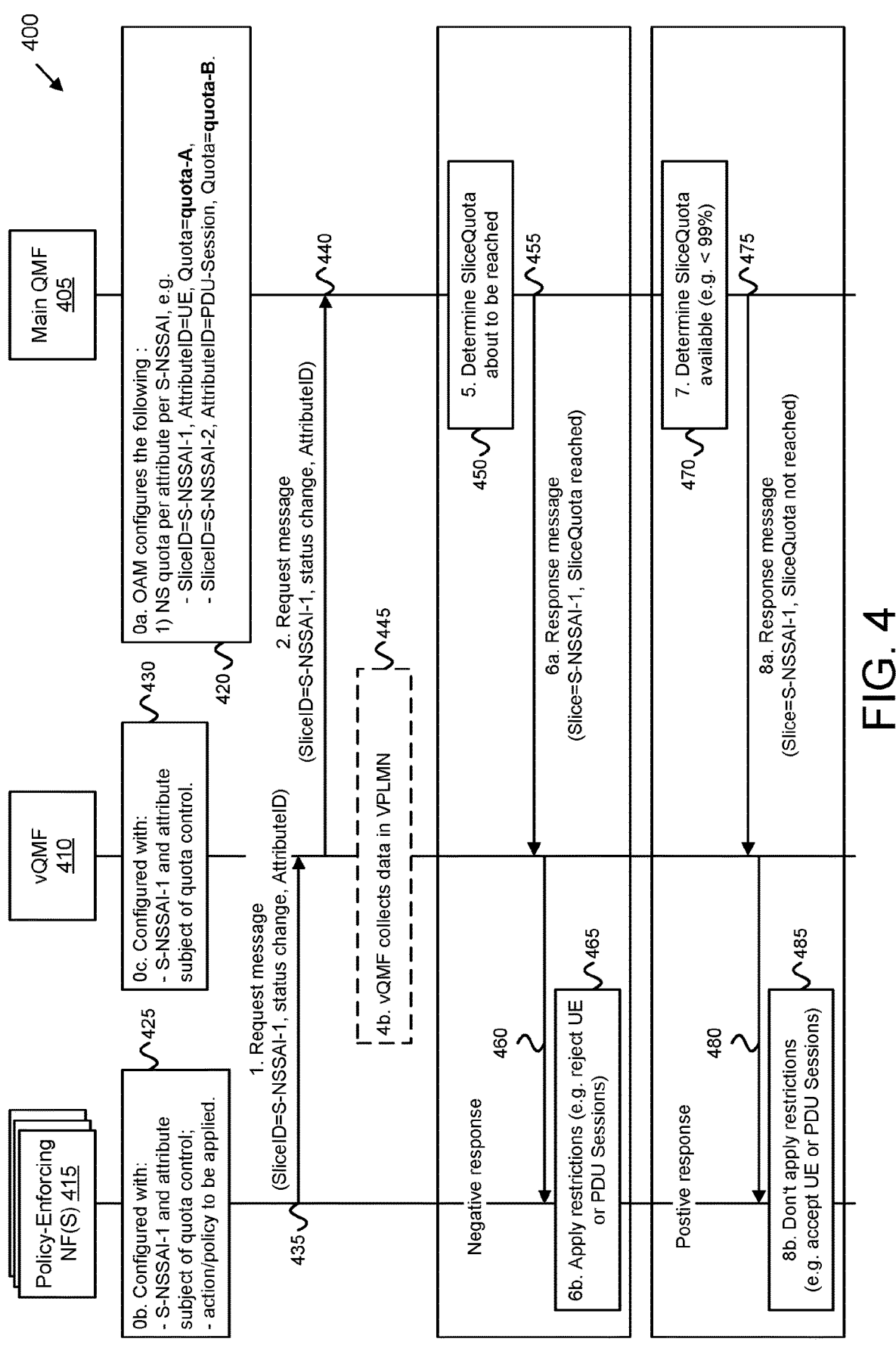
FIG. 4 is a diagram illustrating one embodiment of controlling the quota of a network slice attribute (i.e., network slice parameter)

FIG. 4 depicts an exemplary signaling flow of a procedure 400 for controlling the quota of a network slice attribute (i.e., network slice parameter), according to embodiments of the disclosure. The procedure 400 involves a main (i.e., central) Quota Management network Function (denoted "main QMF") 405, a distributed QMF (denoted "vQMF") 410, and a set of policy-enforcing network functions 415. While a single distributed QMF 410 is shown for case of illustration, the procedure 400 may involve multiple distributed QMFs 410. The main QMF 405 and the vQMFs 410 may each be embodiments of the QMF 145. The policy-enforcing NFs 415 may be one or more of the AMF 142, the SMF 143, and/or the PCF 144. The detailed description of procedure 400 is as follows:

As a prerequisite, the main QMF 405, the distributed QMF(s) 410, and the policy-enforcing NFs 415 are configured (e.g., by the OAM, or pre-configured locally in the corresponding function) with the following information:

At Step 0a, the main QMF 405 is configured with a network slice quota (i.e., maximum number) per attribute per S-NSSAI (see block 420). For example, for SliceID=S-NSSAI-1 the AttributeID=UE is to be controlled and the Quota is quota-A; for SliceID=S-NSSAI-2, the AttributeID=PDU-Session is to be controlled and the Quota is quota-B. In certain embodiments, the main QMF 405 also may be configured (or preconfigured) with multiple thresholds per slice quota for a network slice attribute, e.g., as described in step 7 from FIGS. 3A-3B.

At Step 0b, the policy-enforcing NFs 415 (e.g., AMF, SMF, and/or PCF) are configured with information that one or more network slices are subject of quota control (also referred to as "admission control"), the attribute to be controlled and the actions to be performed (or policy enforced) when the slice quota is reached (see block 425). In one example, the action to be performed is to reject the UEs or PDU session, if the response from the vQMF indicates that the quota is reached. In some embodiments, the OAM system may configure the policy-enforcing NFs 415 with such information. In certain embodiments, the quota value may not be configured in the policy-enforcing NFs 415.

At Step 0c, the distributed QMF(s) 410 (e.g., in the same network/PLMN or in roaming partners' networks/V-PLMNs) are configured with information that that one or more network slices (i.e., identified by S-NSSAI) and the corresponding slice parameters that are subject of quota/admission control (see block 430). In addition, the distributed QMF(s) 410 may be configured with a local quota of the slice parameter(s). In some embodiments, the OAM system may configure the distributed QMF 410 with such information. In other embodiments, the main QMF 405 may configure the local quota at the distributed QMF(s) 410, which is described as part of Step 6a or Step 8a, but may be an independent signaling as shown in Step 3 of FIG. 3A.

The local quota can be dynamically sent from main QMF 405 to the distributed QMF 410. When the local quota is met, the distributed QMF 410 reports this to the main QMF 405. In the roaming case, the distributed QMF 410 is configured upon SLAs between the H-PLMN (i.e., where main QMF 405 resides) and the V-PLMN (i.e., where the distributed QMF 410 resides).

At Step 1, during a status reporting phase, a policy-enforcing NFs 415 (e.g., AMF, SMF, or PCF) may send a request message to the distributed QMF 410 (see messaging 435). The parameters in the request message include A) a Slice ID, for example SliceID=S-NSSAI-1, B) an indication that an attribute status is to be changed (e.g., to increase or to decrease), and C) an Attribute ID that identifies that attribute whose status is to be changed (e.g., number of UEs or number of PDU Sessions). In various embodiments, the distributed QMF 410 is subscribed with the policy-enforcing NFs 415 (e.g., AMF, SMF, or PCF) to report a status change event for the S-NSSAI and attribute subject to quota control. In some embodiments, the indication that the attribute status is to be changed is a specific value of EventID. Please note that step 1 may be triggered by a request from a UE either (A) to an AMF to register with the network slice S-NSSAI-1 or (B) to an SMF to establish a PDU Session associated with the network slice S-NSSAI-1.

At Step 2, the distributed QMF 410 forwards the request message to the main QMF 405 (see messaging 440). In some embodiments, the main QMF 405 is subscribed with the distributed QMF 410 to report a status change event for the S-NSSAI and attribute subject to quota control. In other embodiments, the distributed QMF 410 may discover the main QMF 405 by using the NRF functionality as described in FIG. 1, whereas the distributed QMF 410 may use the network slice ID and network slice attribute/parameter (e.g., UEs or PDU sessions) as input to the NRF.

At Optional Step 4b, the distributed QMF 410 collects status data from the reporting NFs (e.g., in the V-PLMN or in an allocated administrative domain in the H-PLMN) which serve the controlled slice attribute(s) (see block 445). Note that the reporting NF(s) maybe one of the policy-enforcing NFs 415. For example, based on the received ReportingQuota, the distributed QMF 410 may subscribe with the AMFs/SMFs in the visited network to collect information about the roaming UEs in the visited network. In other words, the distributed QMF 410 performs Steps 3a, 4a and 4b from FIG. 3A in the visited network/administrative domain. Additionally, the distributed QMF 410 may perform in the visited network/administrative domain the Steps 7-8 as described in FIG. 3B, with respect to the local quota.

At Step 5, during the policy enforcement phase, the main QMF 405 monitors the status of the controlled slice attribute. The main QMF 405 performs the steps 7-8 from FIG. 3B. If the main QMF 405 determines that the network slice quota is about to be reached (or consumed), the main QMF 405 sends notifications for a negative response, comprising step 5-6 (see block 450).

At Step 6a, the main QMF 405 sends a response message to the distributed QMF 410 containing the Slice ID (i.e., the S-NSSAI subject to quota control) and a result indicating that the slice quota is reached (see messaging 455). In various embodiments, the indication that the slice quota is reached is a specific value of EventID (i.e., "EventID=SliceQuotaReached"). The parameter "EventID=SliceQuotaReached" is meant to identify the event that the network slice quota (e.g., for S-NSSAI-1 and specific slice attribute) has been reached (or consumed). As part of step 6a or as an additional signaling message, the main QMF 405 may send a new local quota value to the distributed QMF 410.

The distributed QMF 410 forwards the response message to the policy-enforcing NF(s) 415, i.e., at least the NF that sent the request in Step 1 and optionally to additional policy-enforcing NFs 415 (e.g., AMF, SMF, or PCF) in the V-PLMN or administrative domain of the H-PLMN (see messaging 460).

At Step 6b, in response to the notification that the slice quota is reached, the policy-enforcing NF(s) 415 apply restrictions based on the attribute subject to quota control (e.g., reject the request from the UE, or start to apply the (pre-)configured policy/action as described in step 0b) (see block 465). For example, where the "AttributeID=UE" is to be controlled, the policy-enforcing NFs 415 may be AMF which may reject the registration request for the network slice that is subject to quota control. As another example, where the "AttributeID=PDU Session" is to be controlled, the policy-enforcing NFs 415 may be an SMF which may reject requests to establish or resume a PDU Session with the network slice that is subject to quota control. As a further example, the policy-enforcing NFs 215 can start reject or throttle of the corresponding controlled slice attribute. Further policies may be pre-configured as described in step 9 from FIG. 3B.

At Step 7, during the policy enforcement phase, the main QMF 405 continues to monitor the status of the controlled slice attribute. If the main QMF 405 determines that the network slice quota is available again (i.e., the quota is less than 99%, or less than 95%), the main QMF 405 triggers corresponding notification to the policy-enforcing NFs 215 (see block 470). The different levels of quota (e.g., as shown 99% and 95%) may be pre-configured in the main QMF 405 in step 0a.

At Step 8a, the main QMF 405 triggers sending of a response message to step 2 or a notification to the distributed QMF 410 (see messaging 475). In case of a service operation Nqmf_QuotaLimit, the main QMF 405 may send to the distributed QMF 410 Nqmf_QuotaLimit_Notify ("Slice=S-NSSAI-1," "EventID=SliceQuotaUnderrun"). Here, the parameter "EventID=SliceQuotaUnderrun" is representative of an Event ID meant to indicate the event that the sub-scribed network slice quota (e.g., for S-NSSAI-1 and specific slice attribute) has fallen below a threshold, i.e., the network slice quota is available again and normal operation (i.e., no restrictions or throttling) is to be applied. Alternatively, the result (or Event ID) sent from the main QMF 405 to the distributed QMF 410 is that the slice quota is not reached. As part of step 8a or as an additional signaling message, the main QMF 405 may send a new local quota value to the distributed QMF 410.

The distributed QMF 410 forwards the response message to the policy-enforcing NF(s) 415, i.e., at least the NF that sent the request in Step 1 and any additional policy-enforc-ing NFs 415 (e.g., AMF, SMF, or PCF) in the V-PLMN or administrative domain of the H-PLMN to which the response message was forwarded in Step 8a (see messaging 480). Please note that the Event IDs in Step 6a and Step 8a are different, i.e., either the same parameter with different values is used, or 2 different parameters are used in the signaling messages.

At Step 8b, in response to the notification that the slice quota is reached, the policy-enforcing NF(s) 415 may accept the request from the UE (i.e., which triggered step 1), or stop applying the restrictions for the slice attribute which has started in Step 6b (see block 485). In other words, the policy-enforcing NF(s) 415 apply normal operation without limitations (or no restrictions or no rejections) regarding the controlled slice attribute.

Figure 5A:
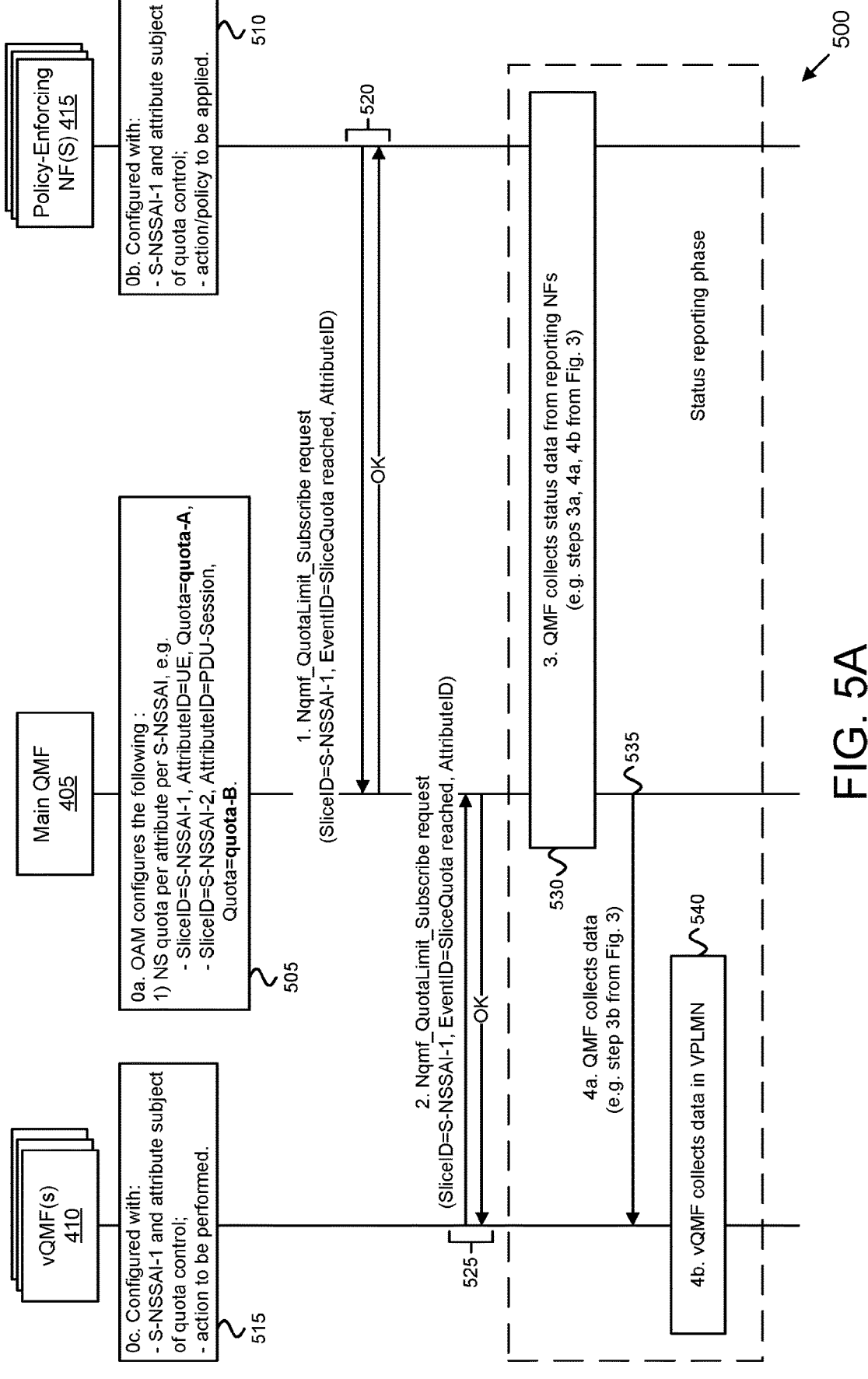
FIG. 5A is a diagram illustrating one embodiment of detailed signaling flow for controlling the quota of slice attribute when the policy-enforcing NF(s) are (pre-)configured with the policy/action.
Figure 5B:
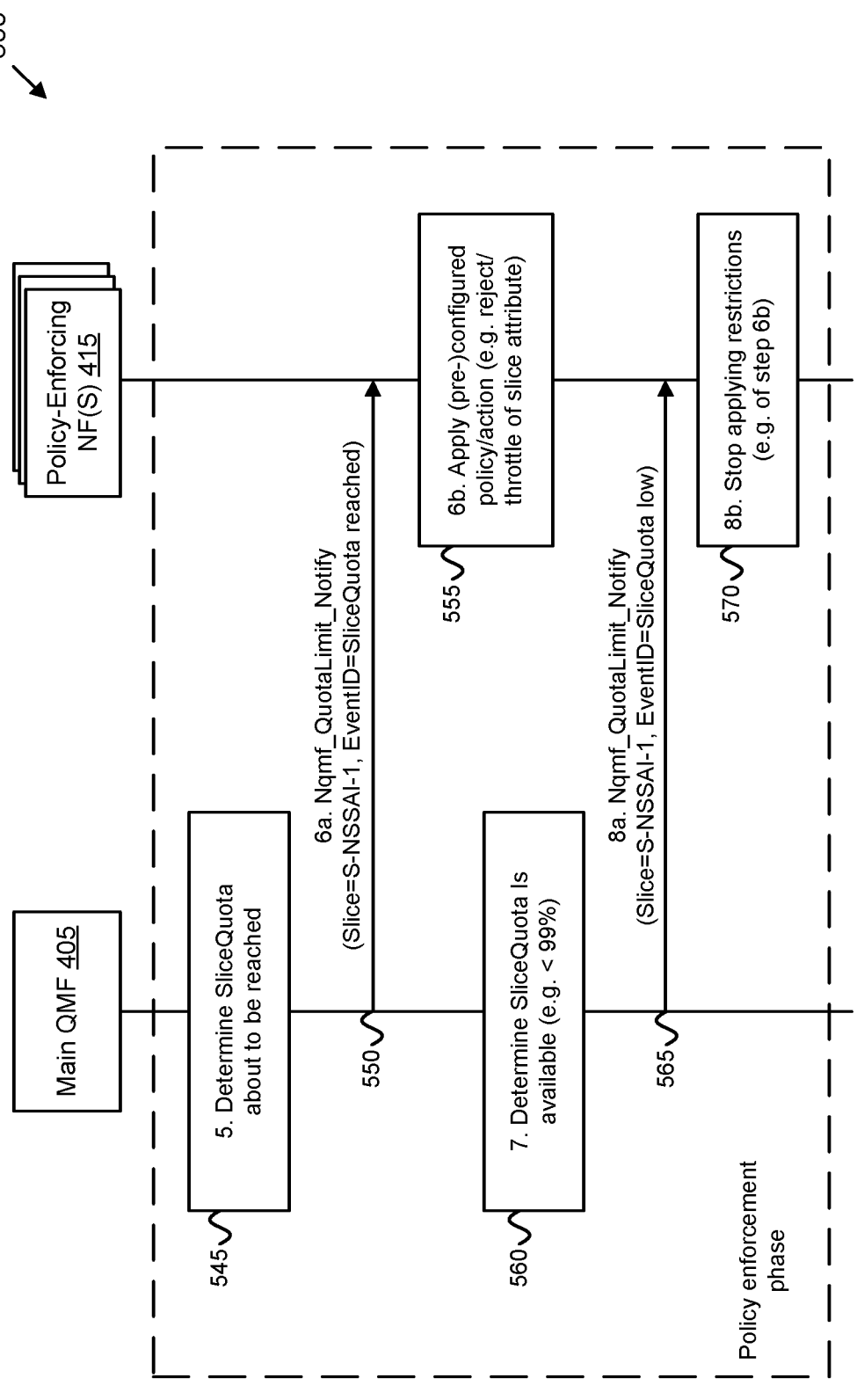
FIG. 5B is a continuation of FIG. 5A.

FIGS. 5A-5B depicts an exemplary signaling flow of a procedure 500 for controlling the quota of a network slice attribute (i.e., network slice parameter) when the policy-enforcing NF(s) are (pre-)configured with the policy/action, according to embodiments of the disclosure. The procedure 500 includes a status reporting phase (comprising Steps 3-4) and a policy enforcement phase (comprising steps 1-2 and 5-8). The procedure involves the main QMF 405, a set of one or more distributed QMFs 410, and a set of one or more policy-enforcing NFs 415. The detailed description of the FIGS. 5A-5B is as follows:

As a prerequisite, the main QMF 405, the distributed QMF(s) 410, and the policy-enforcing NFs 415 are config-ured (e.g., by the OAM, or pre-configured locally in the corresponding function) with the following information:

At Step 0a, the main QMF 405 is configured with a network slice quota per attribute per S-NSSAI (see block 505). For example, for "SliceID-S-NSSAI #1" the "AttributeID=UE" should be controlled, and the Quota is "quota-A" and for "SliceID=S-NSSIA #2," the "AttributeID=PDU-Session" should be controlled, and the Quota is "quota-B." The main QMF 405 may be also (pre-)configured with multiple thresholds per slice quota for a slice attribute as described in step 7 from FIG. 3B.

At Steps 0b and 0c, the distributed QMF(s) 410 and policy-enforcing NFs 415 (e.g., AMF, SMF, and/or PCF) are configured with information that one or more network slices are the subject of quota/admission control, the attribute to be controlled and the actions to be performed (or policy enforced) when the slice quota is reached (see blocks 510 and 515). In some embodiments, the OAM system may configure the distributed QMF(s) 410 and policy-enforcing NFs 415 with such information. In certain embodiments, the quota value is configured in the policy-enforcing NFs 415. In the roaming case, the distributed QMF(s) 410 are con-figured upon SLAs between the H-PLMN and V-PLMN.

At Step 1, after being configured with one or more controlled slice attributes (as per step 0b), the policy-enforcing NFs 415 (e.g., AMF, SMF, or PCF) subscribe with the main QMF 405 to be notified when a quota is consumed (or reached) (see messaging 520). In some embodiments, the policy-enforcing NFs 415 first discover the main QMF 405 responsible for the specific S-NSSAI, (e.g., S-NSSAI-1, S-NSSAI-2). The policy-enforcing NFs 415 may discover the specific QMF 405 for the S-NSSAI-1 by using the NRF services, where the NF type is set to be "QMF" and the slice ID is used as an input parameter.

The NF(s) may send a request to subscribe with the QMF by using Event Exposure service (Nqmf_EventExposure) or a new service (e.g., Nqmf_QuotaLimit) can be introduced. In the depicted embodiments a new service is introduced, where the request message invokes the services "Nqmf_QuotaLimit_Subscribe" and includes parameters: SliceID=S-NSSAI-1, AttributeID, EventID=SliceQuota reached. Here, the parameter "EventID" may identify that the requesting NF is to be notified when the network slice quota for a specific attribute (corresponding to AttributeID) is reached or is about to be reached (when the quota is equal or larger, e.g., 95%) and when the network slice quota falls below a threshold (i.e., the slice quota is available again). In other words, there may be two events which are reported by the main QMF 405—one event is that the quota is reached/consumed and the other event that the quota is underrun. In one embodiment, the policy-enforcing NFs 415 may subscribe to both events. In another embodiment, the policy-enforcing NFs 415 may subscribe to a single event, but receive two different notifications (i.e., different notification events).

If the policy-enforcing NFs 415 are configured with multiple thresholds to determine whether a quota is reached and available again, e.g., similar to the hysteresis for the threshold as described in step 7 from FIG. 3B, the policy-enforcing NFs 415 may configure those quota levels in the QMF during the step 1. Please note that this second solution relies on the appropriate configuration in the policy-enforcing NFs, i.e., the policy-enforcing NFs 415 will perform Step 1 after a configuration in Step 0b occurs.

At Step 2, the distributed QMF(s) 410 (e.g., in different administrative domains pf the same network/PLMN or in roaming partners networks/V-PLMNs) initiate the signaling to register with the main QMF 405 in the H-PLMN (see messaging 525). In the roaming case, the distributed QMF(s) 410 may be pre-configured with the home QMF's ID (e.g., IP address or Fully Qualified Domain Name ("FQDN")), or the distributed QMF(s) 410 can use NRF services to discover the main QMF 405 in the H-PLMN. The policy-enforcing NFs 415 (e.g., AMF, SMF, or PCF) subscribe with the main QMF 405 to be notified when a quota is consumed (or reached).

At Step 3, the main QMF 405 collects status data from reporting NFs which serve the controlled slice attribute(s) (see block 530). Note that the reporting NFs may include one or more of the policy-enforcing NFs 415. In various embodiments, this status data collection step may be implemented by performing steps 3a, 4a and 4b from FIG. 3A.

At Step 4a, the main QMF 405 requests the distributed QMF(s) 410 to collect data (see messaging 535). In some embodiments, the main QMF 405 subscribed with the distributed QMF(s) 410 for status reporting of the network slice attribute to be monitored, e.g., by performing step 3b from FIG. 3A.

At Step 4b, the distributed QMF(s) 410 collect status data from the reporting NFs in the visited network (see block 540). Here, the distributed QMF(s) 410 may perform similar steps in the visited network (e.g., V-PLMN) as the main QMF 405 performs in the H-PLMN (e.g., as described in steps 3a, 4a/4b, and 6 from FIG. 3A). For example, based on the received parameter ReportingQuota, the distributed QMF(s) 410 may subscribe with the AMFs/SMFs in the visited network to collect information about the roaming UEs in the visited network.

Continuing on FIG. 5B, during the policy enforcement phase, the main QMF 405 collects data about (i.e., monitors) the status of the controlled slice attribute. At Step 5, upon determining that the network slice quota is about to be reached (or consumed), the main QMF 405 triggers the notifications as subscribed in step 1 and step 2 (see block 545). In some embodiments, the main QMF 405 requests an AF and/or the OAM about policy, e.g., as described in step 8 from FIG. 3B.

At Step 6a, the main QMF 405 triggers sending of a notification to the enforcing NF(s) which has subscribed in step 1 and step 2 (see messaging 550). In case of a service operation Nqmf_QuotaLimit, the main QMF 405 may send to the NF(s) Nqmf_QuotaLimit_Notify ("Slice=S-NSSAI-1," "EventID=SliceQuotaReached"). Here, the parameter "EventID=SliceQuotaReached" is representative of an Event ID that indicates that the subscribed network slice quota (e.g., for S-NSSAI-1 and specific slice attribute) has been reached (or consumed). Note that the main QMF 405 may also send notifications to the distributed QMF(s) 410, which is not shown in the figure. Note that the distributed QMF(s) 410 may perform the steps 7-10 as described in FIG. 3B.

At Step 6b, the policy-enforcing NFs 415 (e.g., AMF, SMF, or PCF) may start to apply the (pre-)configured policy/action as described in step 0b (see block 555). For example, the policy-enforcing NFs 415 can start reject or throttle of the corresponding controlled slice attribute.

Further policies may be pre-configured, e.g., as described in step 9 from FIG. 3B. For example, the policy/action may depend on the level of the quota (please see the example with 90%, 95% and 99%) or on other policy applicability. In such case, the policy-enforcing NFs 415 and/or distributed QMF(s) 410 may have subscribed for multiple quotas in step 1 or step 2.

At Step 7, the main QMF 405 continues to monitor the status of the controlled slice attribute. If the main QMF 405 determines that the network slice quota is available again (i.e., the quota is less than 99%, or less than 95%), then the main QMF 405 triggers corresponding notification to the policy-enforcing NFs 415 (and any distributed QMF 410 notified in Step 6a) (see block 560). In some embodiments, different levels of quota (e.g., as shown 99% and 95%) may be pre-configured in the main QMF 405 in step 0a.

At Step 8a, the main QMF 405 triggers sending of a notification to the policy-enforcing NFs 415 which has subscribed, e.g., as in steps 1 and 2, or to which the QMF has already sent notification in step 6a (see messaging 565). Note that the main QMF 405 may also send notifications to the distributed QMF(s) 410, which is not shown in the figure. In case of a service operation Nqmf_QuotaLimit, the main QMF 405 may send to the NF(s) Nqmf_QuotaLimit_Notify (Slice=S-NSSAI-1, EventID=SliceQuotaUnderrun).

The parameter "EventID=SliceQuotaUnderrun" is representative of an Event ID meant to indicate the event that the subscribed network slice quota (e.g., for S-NSSAI-1 and specific slice attribute) has fallen below a threshold, i.e., the network slice quota is available again and normal operation (i.e., no restrictions or throttling) is to be applied. Note that the event IDs in step 6a and 8a are different, i.e., either the same parameter with different values is used, or 2 different parameters are used in the signaling messages.

At Step 8b, the policy-enforcing NFs 415 (e.g., AMF, SMF) stop applying the restrictions for the slice attribute which has started in step 6b (see block 570). In other words, the policy-enforcing NFs 415 apply normal operation without limitations (or restrictions) regarding the controlled slice attribute.

The method of the second solution is particularly beneficial when the policies to be applied (when a slice quota is consumed/reached) can be statically pre-configured in the policy-enforcing NFs 415. This type of static policy configuration may be reasonable when a single policy is applied, e.g., apply rejection/restriction of the controlled slice attribute when the slice quota is reached. In case of multiple or different policies to be applied (or enforced), the first solution can be beneficial where the main QMF 405 creates and sends dynamic policies.

According to a third solution, the QMF exposes an API to AF. In this solution, it is assumed that the 5GC exposes service(s) realized by API to application function ("AF"). The AF can subscribe with the QMF to be notified when a specific slice quota is reached. The AF may be a part of the network slice customer domain. Between the network operator and the slice customer there may be SLA in place. Based on the SLA exchange, it is assumed that the AF is configured with the corresponding information for the specific network slice which is instantiated in the network domain.

FIGS. 6A-6B depict an example procedure 600 how the NEF/AF may use exposed 5GC capability, more specifically QMF capability, to request notifications about events based on the specific quota level. The QMF offers Event Exposure (or Event Notification) service to NEF/AF, similar to the service offered to the policy-enforcing NFs 415 described in FIGS. 5A-5B. In other words, the QMF provides slice quota related events to NF consumers (AF/NEF, AMF, SMF, PCF, etc.) that have subscribed for the events.

The procedure 600 involves a QMF 605, a Binding Support Function ("BSF") and Network Repository Function ("NRF") (depicted as combined entity "BSF/NRF" 610), a Network Exposure Function ("NEF") 615 and an Application Function ("AF") 620. Note that the AF 620 may contact a core NF directly or indirectly via the NEF 615. Hereinafter, the term "AF/NEF" is used to describe such direct or indirect communication. The detailed description of the FIGS. 6A-6B is as follows:

At Step 0a, the QMF 605 is configured by the operations, administration and management ("OAM") system to control/manage particular network slice attribute(s) for a network slice identified by S-NSSAI-1 (see block 625). This configuration may be as described in step 0 at FIG. 3A with the additional configuration that the QMF 605 may need to expose event notifications to AF(s), so that the QMF 605 may need to register with the BSF for the specific S-NSSAI.

At Step 0b, the AF 620 may be configured with slice/service identifier ("ID") or Group Generic Public Subscription Identifier ("Group-GPSI") to be used during the signaling exchange with the 5GC (see block 630). For example, the slice/service ID or Group-GPSI can be configured during the SLA between the network operator and the slice customer.

At Step 1, the QMF 605 registers in the BSF/NRF 610 for a specific S-NSSAI and/or slice attribute (see block 635). If a single QMF instance serves all slice attributes for an S-NSSAI, then the QMF 605 registers the S-NSSAI in the BSF/NRF 610. If one QMF instance serves a specific slice attribute for an S-NSSAI, and another QMF instance serves another specific slice attribute for the same S-NSSAI, then the QMF 605 registers both S-NSSAI in the BSF/NRF 610. The BSF or NRF acknowledge the registration.

At Step 2, the AF 620 is aware that the network (e.g., the 5GC) exposes the service to notify the network slice quota status, e.g., the service offered by the QMF 605. For example, the AF 620 may be aware based on the SLA that the 5GC exposes (e.g., offers) the network slice quota notification service for one or more slice attributes.

The AF 620 (e.g., via NEF 615) may request the service for a specific network slice (see messaging 640). The NEF 615 may discover the QMF 605 which serves a specific S-NSSAI. The NEF 615 can authorize the AF 620 to use the services exposed by the QMF 605 (see block 645). For example, the AF 620 and/or NEF 615 may send a QMF discovery request to the BSF/NRF 610, where the AF/NEF request includes an identifier of the network slice (see messaging 650). As the S-NSSAI may be used only internally in the network domain, the discovery request may include a service identifier (e.g., serviceID) or a (group) external identifier (e.g., Group-GPSI). The serviceID or the Group-GPSI is translated to S-NSSAI internally in the NEF 615 or the NEF 615 can request a UDM to map the serviceID or the Group-GPSI to S-NSSAI.

At Step 3, the AF/NEF request the QMF 605 for notification when a certain level of the slice quota is reached (see messaging 655). For example, the AF 620 (i.e., directly and/or via NEF 615) can send Nqmf_Event Notification_Subscribe request (SliceID=S-NSSAI-1, [AttributeID-1, EventID=QuotaLevel-1], [AttributeID-2, EventID=QuotaLevel-2], period). The parameter vector "[AttributeID-1, EventID=QuotaLevel-1]" may identify that for attribute 1 the event for notification is when a specific quota level (QuotaLevel-1) is reached. One example for the quota level is to express it in percentage of the full quota, i.e., 85% or 95% of the slice quota. Recall that the AF 620 may contact the QMF 605 directly (i.e., shown by the continuous line) or indirectly via the NEF 615 (i.e., shown by the dotted line).

Continuing on FIG. 6B, at Step 4, the QMF 605 collects the current status of a controlled slice attribute (see block 660). When the QMF 605 determines that a requested slice quota is reached, e.g., the slice quota is equal or larger than level (e.g., 95%), the QMF 605 creates and sends notification to the AF 620 (i.e., directly and/or via NEF 615). The reason to set a level below 100% (e.g., 95%) is that the system may take some actions before the maximum quota is reached, which would avoid the rejections or throttling of the slice attribute by a policy-enforcing NF (e.g., AMF, SMF, PCF).

At Step 5, the QMF 605 sends to the AF 620 (i.e., directly and/or via NEF 615) a notification about the status of the subscribed slice quota (see messaging 665). For example, the QMF 605 may send a notification Nqmf_EventNotification_Notify (QuotaLevel-1_Reached) whereas the "QuotaLevel-1_Reached" means that the requested quota level was reached.

At Step 6A, in one alternative, the AF 620 may determine application layer action(s) based on the notifications received by the QMF 605 (see block 670).

At Step 6B, in another alternative, the AF 620 may determine policies to be performed while the network slice quota is exceeded. In such case, the AF 620 may send the policies to the QMF 605 to be applied while the slice quota is exceeded (see block 675). In one example, the policy is described by the parameter "PolicyID" in step 9 from FIG. 3B. Optionally, the AF 620 may send a new quota value, e.g., a higher quota value, which may overwrite the current quota. The QMF 605 would apply the policies and send them to the policy-enforcement NFs.

For example, the AF 620 may send to the QMF 605 a Nqmf_QuotaPolicy_Create request (AttributeID, [policy, or new quota]). Here, the parameter "AttributeID" identifies the controlled slice parameter. The parameter "[policy, or new quota]" identifies that either a new policy is sent, or new quota value, or both.

At Step 7, the QMF 605 may determine that the current slice quota consumption is smaller than level (e.g., less than 95%) (see block 680). In such case the QMF 605 may determine to notify the AF 620.

At Step 8, the QMF 605 sends Nqmf_Event Notification_Notify (QuotaLevel-1_Underrun) whereas the "QuotaLevel-1_Underrun" means that the requested quota level is available again, which means that the quota consumption falls below the quota level (see messaging 685).

At Step 9, if the AF 620 has created and sent policies to the QMF 605, the AF 620 may determine to delete or update the policies. In such case, the AF 620 may send Nqmf_QuotaPolicy_Update request (policy) message to the QMF 605

(see messaging 690). The 'policy' indicates that a new policy overwrites the existing policies, if any, in the QMF 605.

Figure 7:
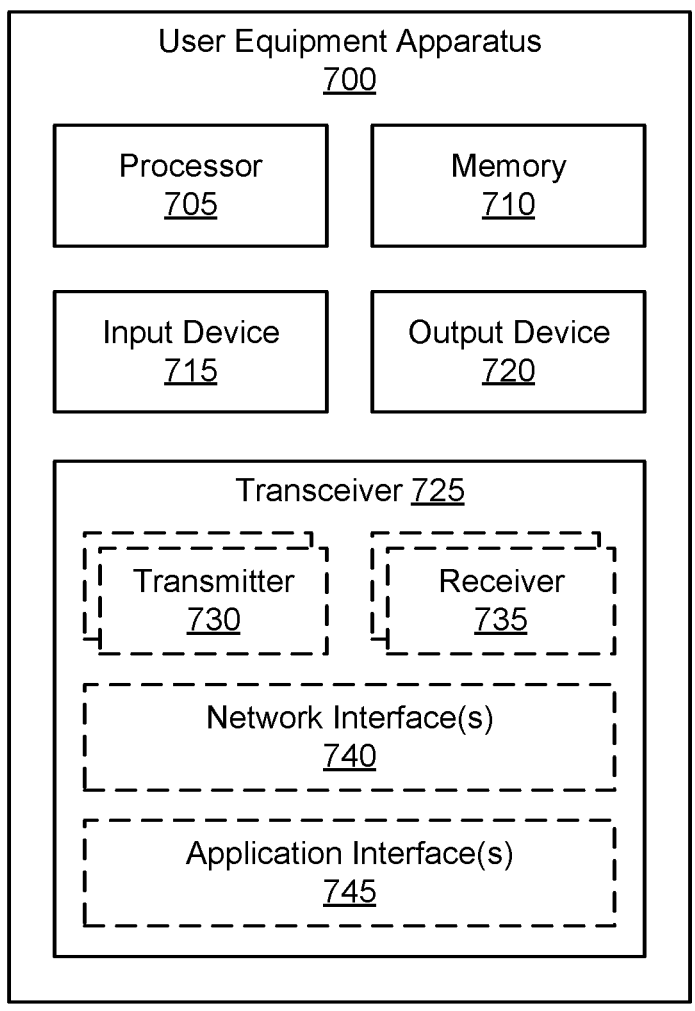
FIG. 7 is a block diagram illustrating one embodiment of a user equipment apparatus that may be used for managing a network slice parameter.

FIG. 7 depicts a user equipment apparatus 700 that may be used for managing a network slice parameter, according to embodiments of the disclosure. In various embodiments, the user equipment apparatus 700 is used to implement one or more of the solutions described above. The user equipment apparatus 700 may be one embodiment of the remote unit 105, described above. Furthermore, the user equipment apparatus 700 may include a processor 705, a memory 710, an input device 715, an output device 720, and a transceiver 725.

In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. In some embodiments, the transceiver 725 communicates with one or more cells (or wireless coverage areas) supported by one or more base units 121. In various embodiments, the transceiver 725 is operable on unlicensed spectrum. Moreover, the transceiver 725 may include multiple UE panels supporting one or more beams. Additionally, the transceiver 725 may support at least one network interface 740 and/or application interface 745. The application interface(s) 745 may support one or more APIs. The network interface(s) 740 may support 3GPP reference points, such as Uu, N1, PC5, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the user equipment apparatus 700 to implement the above described UE behaviors. In certain embodiments, the processor 705 may include an application processor (also known as "main processor") which manages application-domain and operating system ("OS") functions and a baseband processor (also known as "baseband radio processor") which manages radio functions.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to managing a network slice parameter and/or mobile operation. For example, the memory 710 may store various parameters, panel/beam configurations, resource assignments, policies, and the like as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 includes at least transmitter 730 and at least one receiver 735. One or more transmitters 730 may be used to provide UL communication signals to a base unit 121, such as the UL transmissions described herein. Similarly, one or more receivers 735 may be used to receive DL communication signals from the base unit 121, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
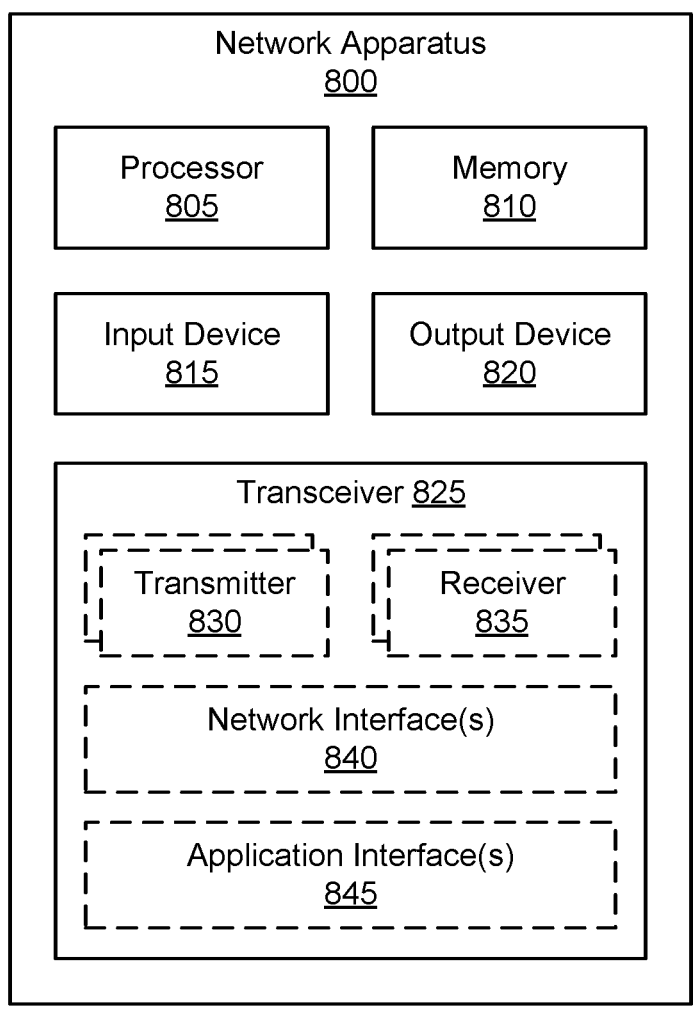
FIG. 8 is a block diagram illustrating one embodiment of a network apparatus that may be used for managing a network slice parameter.

FIG. 8 depicts a network apparatus 800 that may be used for managing a network slice parameter, according to embodiments of the disclosure. In one embodiment, network apparatus 800 may be one implementation of a global network slice admission control function, such as the QMF 145, the central QMF 205, the main QMF 405, and/or the QMF 605, as described above. In another embodiment, the network apparatus 800 may be one implementation of a proxy network slice admission control function, such as a QMF 145, a distributed QMF, the vQMF 210, and/or the vQMF 410, as described above. Furthermore, the network apparatus 800 may include a processor 805, a memory 810, an input device 815, an output device 820, and a transceiver 825.

In some embodiments, the input device 815 and the output device 820 are combined into a single device, such as a touchscreen. In certain embodiments, the network apparatus 800 may not include any input device 815 and/or output device 820. In various embodiments, the network apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as Uu, N1, N2 and N3. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the network apparatus 800 is a RAN node (e.g., gNB) that communicates with one or more UEs, as described herein. In such embodiments, the processor 805 controls the network apparatus 800 to perform the above described RAN behaviors. When operating as a RAN node, the processor 805 may include an application processor (also known as "main processor") which manages application-domain and operating system ("OS") functions and a baseband processor (also known as "baseband radio processor") which manages radio functions.

In various embodiments, the processor 805 controls the apparatus 800 to implement the above vQMF functions. In some embodiments, the transceiver 825 (i.e., implementing a network interface) receives a request from a first reporting network function (e.g., from AMF or SMF), the request including a status change indication (i.e., increased or decreased) of at least one network slice parameter for admission control. The transceiver 825 sends a second request to a global network slice admission control function about the status change of a network slice parameter and receives a response from the global network slice admission control function, said response comprising a result indication for the network slice parameter.

In some embodiments, the processor 805 enforces admission control at one or more reporting network functions in the mobile communication network and sends the result indication to the first reporting network function and, optionally, to one or more additional reporting network functions. In some embodiments, the result indication received from the global network slice admission control function includes either an indication that a maximum value of the network slice parameter is not reached, or an indication that the maximum value of the network slice parameter is reached.

In some embodiments, the network slice parameter comprises at least one parameter selected from: a number of UEs registered with the network slice, a number of established data connections (i.e., PDU Sessions) in the network slice, a maximum downlink data throughput, a maximum uplink data throughput, and combinations thereof. In some embodiments, the transceiver 825 sends the request to the global network slice admission control function in response to determining that a local quota is reached for the network slice parameter.

In certain embodiments, the processor 805 determines a network slice parameter status from at least one reporting network function and determines whether the local quota is reached for the network slice parameter based on the network slice parameter status. In certain embodiments, the local quota is received from at least: the global network slice admission control function or from an OAM system.

In various embodiments, the processor 805 controls the apparatus 800 to implement the above QMF functions. In some embodiments, the transceiver 825 (i.e., implementing a network interface) receives a request from a proxy network slice admission control function, the request indicating a status change for a network slice parameter for admission control. The processor 805 determines whether a network slice quota (i.e., a global quota) for the network slice parameter is reached and sends a response to the proxy network slice admission control function, said response comprising at least one of: a result indication or a new local quota for the network slice parameter.

In some embodiments, the result indication sent to the proxy network slice admission control function includes either an indication that a maximum value of the network slice parameter is not reached, or an indication that the maximum value of the network slice parameter is reached. In some embodiments, the network slice parameter comprises at least one parameter selected from: a number of UEs registered with the network slice, a number of established data connections (i.e., PDU Sessions) in the network slice, a maximum downlink data throughput, a maximum uplink data throughput, and combinations thereof.

In some embodiments, comprising transmitting a subscribe request to a plurality of proxy network slice admission control functions, each subscribe request comprising a particular local quota, wherein the sum of all particular local quotas is less than or equal to the network slice quota. In certain embodiments, each of the plurality of proxy network slice admission control functions is associated with a different administrative domain of the mobile communication network. In some embodiments, the proxy network slice admission control function is associated with a visited network belonging to a roaming partner of the mobile communication network.

In some embodiments, the processor 805 collects status information for the network slice parameter from at least one reporting network function and updating a status of the network slice parameter based on the collected status information and the received request. In certain embodiments, collecting the status information includes sending a subscribe request to the at least one reporting network function for an indication of a status change of the network slice parameter, the subscribe request indicating the network slice parameter for admission control and a reporting granularity for reporting the status information. In other embodiments, collecting the status information comprises sending a status query and receiving the status information in a response to the query.

In some embodiments, determining whether the network slice quota for the network slice parameter is reached includes updating a status of the network slice parameter based on the received request and comparing the updated status to the network slice quota. In such embodiments, the network slice quota is determined to be reached when the updated status is within a predetermined threshold of the network slice quota. In some embodiments, the transceiver 825 receives a request for admission control from a network management system (e.g., OAM), wherein the request for admission control indicates the network slice subject to admission control, the slice attribute to be monitored, the network slice quota (i.e., a global quota), and policy to be enforced upon reaching the network slice quota.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to managing a network slice parameter and/or mobile operation. For example, the memory 810 may store parameters, configurations, resource assignments, policies, and the like, as described above. In certain embodiments, the memory 810 also stores program code and related data, such as an operating system or other controller algorithms operating on the apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to communicate with the UE, as described herein. Similarly, one or more receivers 835 may be used to communicate with network functions in the Public Land Mobile Network ("PLMN") and/or RAN, as described herein. Although only one transmitter 830 and one receiver 835 are illustrated, the network apparatus 800 may have any suitable number of transmitters 830 and receivers 835. Further, the transmitter(s) 830 and the receiver(s) 835 may be any suitable type of transmitters and receivers.

Figure 9:
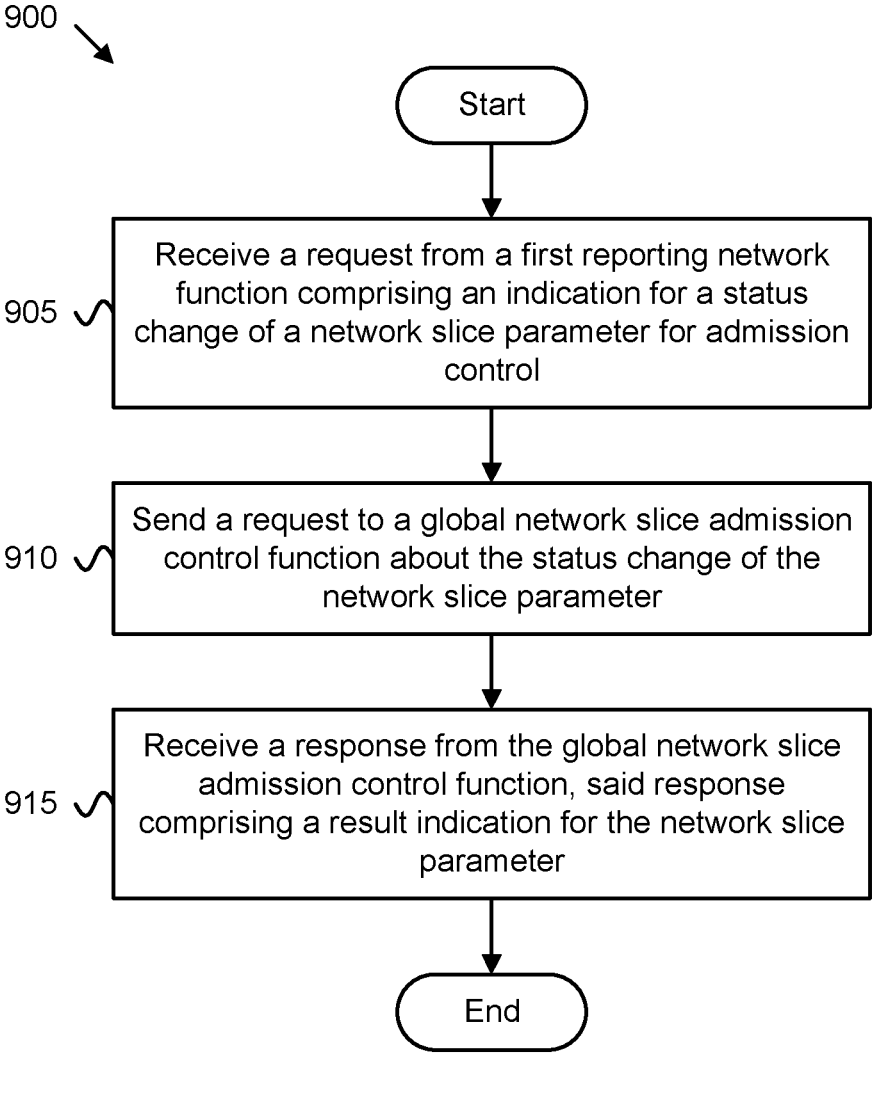
FIG. 9 is a flowchart diagram illustrating one embodiment of a first method for managing a network slice parameter.

FIG. 9 depicts one embodiment of a method 900 for managing a network slice parameter, according to embodiments of the disclosure. In various embodiments, the method 900 is performed by a proxy network slice admission control function, such as a QMF 145, a distributed QMF, the vQMF 210, the vQMF 410, and/or the network apparatus 800, described above as described above. In some embodiments, the method 900 is performed by a processor, such as a microcontroller, a microprocessor, a CPU, a GPU, an auxiliary processing unit, a FPGA, or the like.

The method 900 begins and receives 905 a request from a first reporting network function (e.g., AMF or SMF) comprising an indication for a status change (i.e., an increase or decrease) of a network slice parameter for admission control. The method 900 includes sending 910 a request to a global network slice admission control function about the status change of the network slice parameter. The method 900 includes receiving 915 a response from the global network slice admission control function, said response comprising a result indication for the network slice parameter. The method 900 ends.

FIG. 10 depicts one embodiment of a method 1000 for managing a network slice parameter, according to embodiments of the disclosure. In various embodiments, the method 1000 is performed by a global network slice admission control function, such as the QMF 145, the central QMF 205, the main QMF 405, the QMF 605, and/or the network apparatus 800, described above as described above. In some embodiments, the method 1000 is performed by a processor, such as a microcontroller, a microprocessor, a CPU, a GPU, an auxiliary processing unit, a FPGA, or the like.

The method 1000 begins and receives 1005 a request from a proxy network slice admission control function, the request indicating a status change for a network slice parameter for admission control. The method 1000 includes determining 1010 whether a network slice global quota for the network slice parameter is reached. The method 1000 includes sending 1015 a response to the proxy network slice admission control function, said response comprising at least one of: a result indication or a new local quota for the network slice parameter. The method 1000 ends.

Disclosed herein is a first apparatus for managing a network slice parameter for admission control in a mobile communication network, according to embodiments of the disclosure. The first apparatus may be implemented by a proxy network slice admission control function, such as a QMF 145, a distributed QMF, the vQMF 210, the vQMF 410, and/or the network apparatus 800, described above. The first apparatus includes a processor and a transceiver (i.e., implementing a network interface) that receives a request from a first reporting network function (e.g., from AMF or SMF), the request including a status change indication (i.e., increased or decreased) of a network slice parameter for admission control. The processor sends a second request to a global network slice admission control function about the status change of the network slice parameter and receives a response from the global network slice admission control function, said response comprising a result indication for the network slice parameter.

In some embodiments, the processor enforces admission control at one or more reporting network functions in the mobile communication network and sends the result indication to the first reporting network function and, optionally, to one or more additional reporting network functions. In some embodiments, the result indication received from the global network slice admission control function includes either an indication that a maximum value of the network slice parameter is not reached, or an indication that the maximum value of the network slice parameter is reached.

In some embodiments, the network slice parameter comprises at least one parameter selected from: a number of UEs registered with the network slice, a number of established data connections (i.e., PDU Sessions) in the network slice, a maximum downlink data throughput, a maximum uplink data throughput, and combinations thereof. In some embodiments, the processor sends the request to the global network slice admission control function in response to determining that a local quota is reached for the network slice parameter.

In certain embodiments, the processor determines a network slice parameter status from at least one reporting network function and determines whether the local quota is reached for the network slice parameter based on the network slice parameter status. In certain embodiments, the local quota is received from at least: the global network slice admission control function or from an OAM system.

Disclosed herein is a first method for managing a network slice parameter for admission control in a mobile communication network, according to embodiments of the disclosure. The first method may be performed by a proxy network slice admission control function, such as a QMF 145, a distributed QMF, the vQMF 210, the vQMF 410, and/or the network apparatus 800, described above. The first method includes receiving a request from a first reporting network function (e.g., AMF or SMF) comprising an indication for a status change (i.e., increase or decrease) of a network slice parameter (i.e., at least one network slice parameter) for admission control. The first method includes sending a request to a global network slice admission control function about the status change of the network slice parameter and receiving a response from the global network slice admission control function, said response comprising a result indication for the network slice parameter.

In some embodiments, the first method includes enforcing admission control at one or more reporting network functions in the mobile communication network and sending the result indication to the first reporting network function and, optionally, to one or more additional reporting network functions. In some embodiments, the result indication received from the global network slice admission control function includes one of: an indication that a maximum value of the network slice parameter is not reached, or an indication that the maximum value of the network slice parameter is reached.

In some embodiments, the network slice parameter includes at least one parameter selected from: a number of UEs registered with the network slice, a number of established data connections (i.e., PDU Sessions) in the network slice, a maximum downlink data throughput, a maximum uplink data throughput, and combinations thereof. In some embodiments, sending the request to the global network slice admission control function occurs in response to determining that a local quota is reached for the network slice parameter.

In certain embodiments, the first method includes determining a network slice parameter status from at least one reporting network function and determining whether the local quota is reached for the network slice parameter based on the network slice parameter status. In certain embodiments, the local quota is received from at least: the global network slice admission control function or from an OAM system.

Disclosed herein is a second apparatus for managing a network slice parameter for admission control in a mobile communication network, according to embodiments of the disclosure. The second apparatus may be implemented by a global network slice admission control function, such as the QMF 145, the central QMF 205, the main QMF 405, the QMF 605, and/or the network apparatus 800, described above. The second apparatus includes a processor and a transceiver (i.e., implementing a network interface) that receives a request from a proxy network slice admission control function, the request indicating a status change for a network slice parameter for admission control. The processor determines whether a network slice global quota for the network slice parameter is reached and sends a response to the proxy network slice admission control function, said response comprising at least one of: a result indication or a new local quota for the network slice parameter.

In some embodiments, the result indication sent to the proxy network slice admission control function includes either an indication that a maximum value of the network slice parameter is not reached, or an indication that the maximum value of the network slice parameter is reached. In some embodiments, the network slice parameter comprises at least one parameter selected from: a number of UEs registered with the network slice, a number of established data connections (i.e., PDU Sessions) in the network slice, a maximum downlink data throughput, a maximum uplink data throughput, and combinations thereof.

In some embodiments, comprising transmitting a subscribe request to a plurality of proxy network slice admission control functions, each subscribe request comprising a particular local quota, wherein the sum of all particular local quotas is less than or equal to the network slice global quota. In certain embodiments, each of the plurality of proxy network slice admission control functions is associated with a different administrative domain of the mobile communication network. In some embodiments, the proxy network slice admission control function is associated with a visited network belonging to a roaming partner of the mobile communication network.

In some embodiments, the processor collects status information for the network slice parameter from at least one reporting network function and updating a status of the network slice parameter based on the collected status information and the received request. In certain embodiments, collecting the status information includes sending a subscribe request to the at least one reporting network function for an indication of a status change of the network slice parameter, the subscribe request indicating the network slice parameter for admission control and a reporting granularity for reporting the status information. In other embodiments, collecting the status information comprises sending a status query and receiving the status information in a response to the query.

In some embodiments, determining whether the network slice global quota for the network slice parameter is reached includes updating a status of the network slice parameter based on the received request and comparing the updated status to the network slice global quota. In such embodiments, the network slice global quota is determined to be reached when the updated status is within a predetermined threshold of the network slice global quota. In some embodiments, the processor further receives a request for admission control from a network management system (e.g., OAM), wherein the request for admission control indicates the network slice subject to admission control, the slice attribute to be monitored, the network slice global quota, and policy to be enforced upon reaching the network slice global quota.

Disclosed herein is a second method for managing a network slice parameter for admission control in a mobile communication network, according to embodiments of the disclosure. The second method may be performed by a global network slice admission control function, such as the QMF 145, the central QMF 205, the main QMF 405, the QMF 605, and/or the network apparatus 800, described above. The second method includes receiving a request from a proxy network slice admission control function, the request indicating a status change for the network slice parameter for admission control. The second method includes determining whether a network slice global quota for the network slice parameter is reached and sending a response to the proxy network slice admission control function, where the response contains a result indication, a new local quota for the network slice parameter, or combinations thereof.

In some embodiments, the result indication sent to the proxy network slice admission control function includes either an indication that a maximum value of the network slice parameter is not reached, or an indication that the maximum value of the network slice parameter is reached. In some embodiments, the network slice parameter comprises at least one parameter selected from: a number of UEs registered with the network slice, a number of established data connections (i.e., PDU Sessions) in the network slice, a maximum downlink data throughput, a maximum uplink data throughput, and combinations thereof.

In some embodiments, comprising transmitting a subscribe request to a plurality of proxy network slice admission control functions, each subscribe request comprising a particular local quota, wherein the sum of all particular local quotas is less than or equal to the network slice global quota. In certain embodiments, each of the plurality of proxy network slice admission control functions is associated with a different administrative domain of the mobile communication network. In some embodiments, the proxy network slice admission control function is associated with a visited network belonging to a roaming partner of the mobile communication network.

In some embodiments, the second method includes collecting status information for the network slice parameter from at least one reporting network function and updating a status of the network slice parameter based on the collected status information and the received request. In certain embodiments, collecting the status information includes sending a subscribe request to the at least one reporting network function for an indication of a status change of the network slice parameter, the subscribe request indicating the network slice parameter for admission control and a reporting granularity for reporting the status information. In other embodiments, collecting the status information comprises sending a status query and receiving the status information in a response to the query.

In some embodiments, determining whether the network slice global quota for the network slice parameter is reached includes updating a status of the network slice parameter based on the received request and comparing the updated status to the network slice global quota. In such embodiments, the network slice global quota is determined to be reached when the updated status is within a predetermined threshold of the network slice global quota. In some embodiments, the second method includes receiving a request for admission control from a network management system (e.g., OAM), wherein the request for admission control indicates the network slice subject to admission control, the slice attribute to be monitored, the network slice global quota, and policy to be enforced upon reaching the network slice global quota.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a proxy network slice admission control function for managing a network slice parameter in a mobile communication network, the method comprising:
receiving, from a first reporting network function, a first request comprising an indication for a status change of a network slice parameter for admission control;
determining whether a first quota is reached for the network slice parameter;
sending, to a primary network slice admission control function, a second request about the status change of the network slice parameter upon determining that the first quota is reached; and
receiving, from the primary network slice admission control function, a response comprising an indication that a maximum value of the network slice parameter is reached and an indication of a second quota.

2. The method of claim 1, further comprising:
enforcing admission control at one or more reporting network functions in the mobile communication network; and
sending the indication to at least the first reporting network function.

3. The method of claim 1, wherein the network slice parameter comprises one or more of:
a number of user equipments (UEs) registered with a corresponding network slice,
a number of established data connections in the corresponding network slice,
a maximum downlink data throughput,
a maximum uplink data throughput, or
combinations thereof.

4. The method of claim 1, further comprising:
determining a network slice parameter status from at least one reporting network function,
wherein determining whether the local first quota is reached for the network slice parameter is based on the network slice parameter status.

5. The method of claim 1, wherein the first quota is received from at least: the primary network slice admission control function or from an operational and management system.

6. A proxy network slice admission control apparatus in a mobile communication network, the apparatus comprising:
a memory; and
a processor coupled with the memory and configured to cause the proxy network slice admission control apparatus to:
receive, from a first reporting network function, a first request comprising an indicator for a status change of a network slice parameter for admission control;
determine whether a first quota is reached for the network slice parameter;

send, to a primary network slice admission control function, a second request about the status change of the network slice parameter upon determining that the first quota is reached; and
receive from the primary network slice admission control function, a response comprising an indication that a maximum value of the network slice parameter is reached and a second quota.

7. A primary network slice admission control apparatus in a mobile communication network, the apparatus comprising:
a memory; and
a processor coupled with the memory and configured to cause the primary network slice admission control apparatus to:
receive, from a proxy network slice admission control function, a request indicating a status change for a network slice parameter for admission control;
determine whether a first quota for the network slice parameter is reached; and
send, to the proxy network slice admission control function, a response comprising an indication that a maximum value of the first quota for the network slice parameter is reached and a second quota for the network slice parameter.

8. The apparatus of claim 7, wherein the network slice parameter comprises one or more of:
a number of user equipments (UEs) registered with a corresponding network slice,
a number of established data connections in the corresponding network slice,
a maximum downlink data throughput,
a maximum uplink data throughput, or
combinations thereof.

9. The apparatus of claim 7, wherein the processor is configured to cause the primary network slice admission control apparatus to transmit a subscribe request to a plurality of proxy network slice admission control functions, each subscribe request comprising a particular second quota, wherein a sum of all particular local second quotas is less than or equal to the first quota for the network slice parameter.

10. The apparatus of claim 9, wherein each of the plurality of proxy network slice admission control functions is associated with a different administrative domain of the mobile communication network.

11. The apparatus of claim 7, wherein the proxy network slice admission control function is associated with a visited network belonging to a roaming partner of the mobile communication network.

12. The apparatus of claim 7, wherein the processor is configured to cause the primary network slice admission control apparatus to:
collect status information for the network slice parameter from at least one reporting network function; and
update a status of the network slice parameter based on the collected status information and the received request.

13. A method performed by a primary network slice admission control function in a mobile communication network, the method comprising:
receiving, from a proxy network slice admission control function, a request indicating a status change for a network slice parameter for admission control;
determining whether a first quota for the network slice parameter is reached; and
sending, to the proxy network slice admission control function, a response comprising an indication that a maximum value of the network slice parameter is reached and a second quota for the network slice parameter.

14. The method of claim 13, wherein the network slice parameter comprises one or more of:

a number of user equipments (UEs) registered with the network slice, a number of established data connections in the network slice, a maximum downlink data throughput, a maximum uplink data throughput, or combinations thereof.

15. The method of claim 13, further comprising transmitting a subscribe request to a plurality of proxy network slice admission control functions, each subscribe request comprising a particular second quota, wherein a sum of all particular second quotas is less than or equal to the first quota for the network slice parameter.

16. The method of claim 15, wherein each of the plurality of proxy network slice admission control functions is associated with a different administrative domain of the mobile communication network.

17. The method of claim 13, wherein the proxy network slice admission control function is associated with a visited network belonging to a roaming partner of the mobile communication network.

18. The method of claim 13, further comprising:

collecting status information for the network slice parameter from at least one reporting network function; and updating a status of the network slice parameter based on the collected status information and the received request.

* * * * *